(12) United States Patent
Kamei et al.

(10) Patent No.: US 6,639,557 B2
(45) Date of Patent: Oct. 28, 2003

(54) SMALL ANTENNA AND MANUFACTURING METHOD THEREOF

(75) Inventors: Yoshikazu Kamei, Tokyo (JP); Hiroki Hamada, Tokyo (JP); Takahiro Ueno, Tokyo (JP); Mituo Yoshino, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 10/033,272

(22) Filed: Dec. 27, 2001

(65) Prior Publication Data

US 2002/0080077 A1 Jun. 27, 2002

(30) Foreign Application Priority Data

| Dec. 27, 2000 | (JP) | 2000-397311 |
| Jan. 10, 2001 | (JP) | 2001-002163 |
| Jan. 12, 2001 | (JP) | 2001-005007 |
| Jan. 24, 2001 | (JP) | 2001-016217 |
| Jul. 18, 2001 | (JP) | 2001-218569 |

(51) Int. Cl.⁷ .............................................. H01Q 1/38
(52) U.S. Cl. ............................ 343/700 MS; 343/873
(58) Field of Search .................. 343/700 MS, 845, 343/846, 828, 829, 873

(56) References Cited

U.S. PATENT DOCUMENTS

| 4,681,718 A |   | 7/1987  | Oldham .................. 264/102 |
| 5,162,810 A | * | 11/1992 | Onisawa et al. ........... 343/912 |
| 5,898,215 A | * | 4/1999  | Miller et al. ............. 257/679 |
| 5,955,021 A | * | 9/1999  | Tiffany, III ............ 264/272.11 |
| 6,049,463 A | * | 4/2000  | O'Malley et al. .......... 361/760 |
| 6,338,812 B1 | * | 1/2002 | Ogura ..................... 264/254 |
| 6,482,287 B1 | * | 11/2002 | De Gaulle ................ 156/245 |

FOREIGN PATENT DOCUMENTS

| EP |  0 854 536 A2 | 7/1998 |           |
| EP |  0 997 968 A1 | 5/2000 |           |
| JP |   408097625 A | * 4/1996 | H01Q/13/08 |

* cited by examiner

Primary Examiner—Don Wong
Assistant Examiner—Shih-Chao Chen
(74) Attorney, Agent, or Firm—Knobbe Martens Olson & Bear LLP

(57) ABSTRACT

A small antenna comprises a planar antenna element, and a resin molded body integrally molded with the antenna element, and the resin molded body has a thin part and a thick part on both sides of the antenna element, and a gate portion at a resin molding is provided to the thin part.

25 Claims, 21 Drawing Sheets

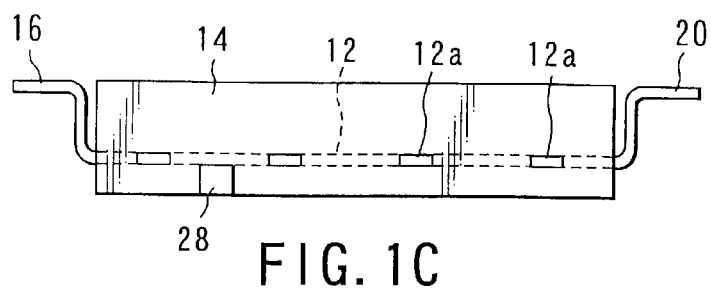
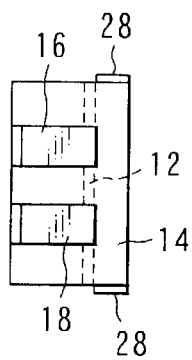
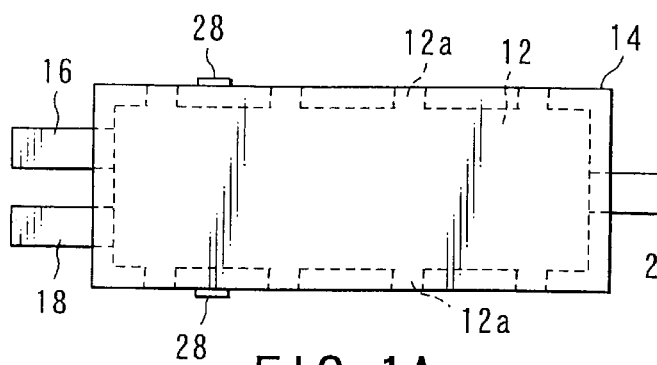
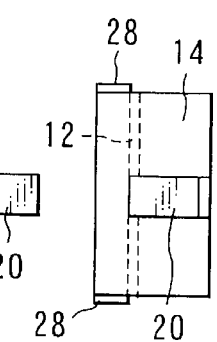
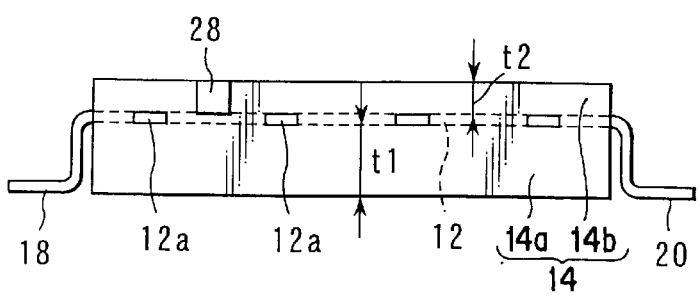
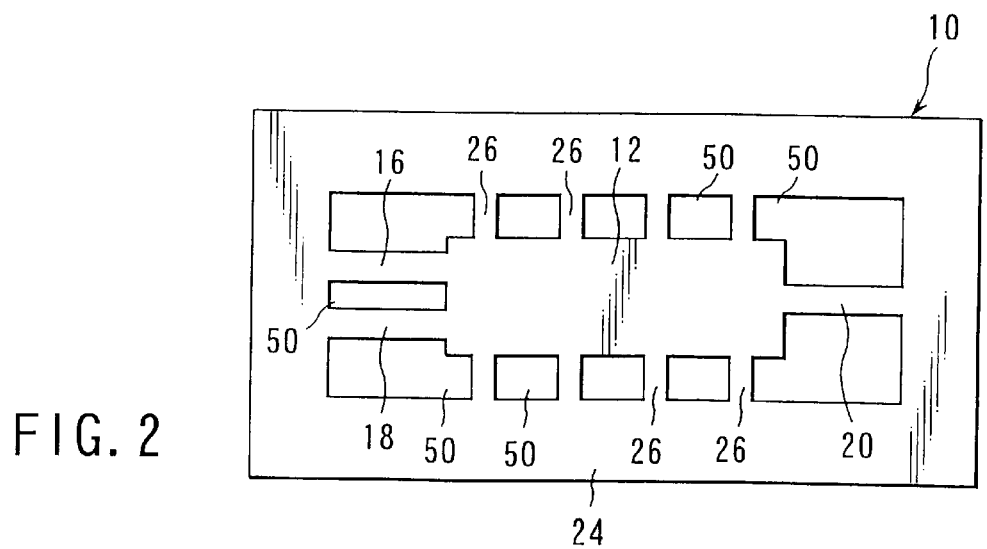

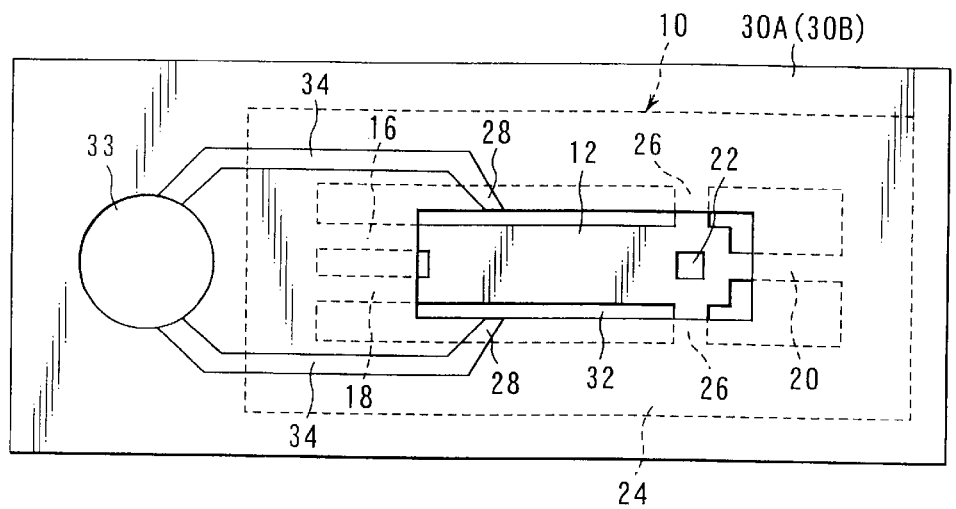
FIG. 20
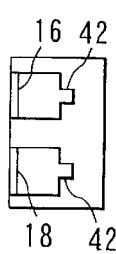 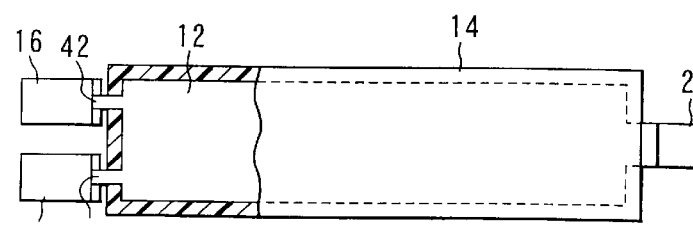 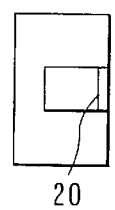
FIG. 21C    FIG. 21A    FIG. 21D
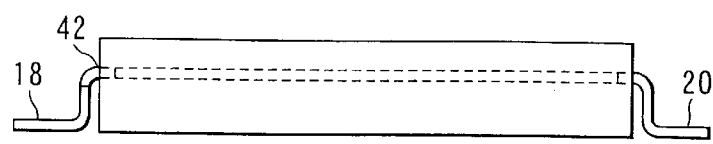
FIG. 21B

SMALL ANTENNA AND MANUFACTURING METHOD THEREOF

CROSS-REFERENCE TO RELATED APPLICATIONS

This application is based upon and claims the benefit of priority from the prior Japanese Patent Applications No. 2000-397311, filed Dec. 27, 2000, No. 2001-002163, filed Jan. 10, 2001; No. 2001-005007, filed Jan. 12, 2001; No. 2001-016217, filed Jan. 24, 2001; and No. 2001-218569, filed Jul. 18, 2001, the entire contents of all of which are incorporated herein by reference.

BACKGROUND OF THE INVENTION

1. Field of the Invention

The present invention relates to a small antenna and a manufacturing method thereof used for small telecommunication equipment such as cellular phones.

2. Description of the Background Art

In a small antenna, the miniaturization is requested as much as possible to reduce the mounting area to a circuit board, etc. A small antenna is mounted in small telecommunication equipments such as cellular phones. Therefore, it is requested to a small antenna that thickness thereof is as thin as possible in addition to the miniaturization.

It is considered that the following molding methods, so-called the insert molding method is employed to this kind of the small antenna. That is, the antenna element is integrated with the resin molded body by setting the antenna element formed to the necessary shape in the mold and injecting the resin.

In a small antenna as mentioned above, the strength of the small antenna lowers, when the area of the antenna element is reduced as much as possible or the thickness of the resin molded body is thinned as much as possible to miniaturize the antenna. Therefore, the antenna becomes easily deformed when producing. The deformation of the antenna influences the impedance characteristic of the antenna. Therefore, it is important to prevent the deformation when the antenna is produced.

BRIEF SUMMARY OF THE INVENTION

An object of the present invention is to provide a small antenna and a manufacturing method thereof, in which the crack of the resin molded body and the deformation of the antenna element are hardly generated.

The small antenna according to the first aspect of the present invention is characterized by comprising: a planar antenna element; and a resin molded body integrally molded with the antenna element, in which the resin molded body has a thin part and a thick part on both sides of the antenna element, and a gate portion at a resin molding is provided to the thin part.

The small antenna according to the second aspect of the present invention is characterized by comprising: a planar antenna element; a resin molded body integrally molded with the antenna element; and a hole formed to the antenna element.

The small antenna according to the third aspect of the present invention is characterized by comprising: an antenna element; and a resin molded body in which the antenna element is embedded or which is accumulated, the antenna element having a terminal extended to an outside of the resin molded body, in which the terminal comprises a narrowed portion with narrow width of a conductor at a base thereof, and the narrowed portion is bent at an outside of the resin molded body.

The manufacturing method of the small antenna according to the fourth aspect of the present invention is characterized by comprising: setting an antenna element to place the antenna element between a first mold and a second mold of the mold; and integrally molding a resin molded body to embed the antenna element by injecting the resin to the mold, in which a depth of a cavity of the first mold is shallower than a depth of a cavity of the second mold, and a gate portion is provided to the first mold.

The manufacturing method of the small antenna according to the fifth aspect of the present invention is characterized by comprising: setting an antenna element in a mold; performing injection molding by injecting a resin which is a dielectric material in the mold; and ejecting a resin molded body by striking an ejector pin to the resin molded body, when the mold is opened and the resin molded body after the injection molding is taken out, in which the resin molded body has the surfaces whose thickness are different at both sides of the antenna element, and ejecting including striking the ejector pin to a thicker surface of the resin molded body and ejecting the resin molded body.

The manufacturing method of the small antenna according to the sixth aspect of the present invention is characterized by comprising: setting an antenna element in a mold; performing injection molding by injecting a resin which is dielectric material in the mold; and ejecting a resin molded body by striking an ejector pin to the resin molded body, when the mold is opened and the resin molded body after the injection molding is taken out, in which ejecting includes striking the ejector pin to a position where a part to which the resin molded body is picked up is avoided and ejecting the resin molded body.

The manufacturing method of the small antenna according to the seventh aspect of the present invention is characterized by comprising: setting an antenna element by placing at least a part between parting faces of a mold; and injecting a resin in the mold, in which setting includes setting the antenna element to form a space in a part where the antenna element is not placed in the parting faces.

The manufacturing method of the small antenna according to the eighth aspect of the present invention is characterized by comprising: setting an antenna element by placing at least a part between parting faces of the mold; and injecting a resin in the mold and performing a molding, in which a plurality of support parts extended to an outside to at least two opposite sides in the antenna element are integrally formed, and setting includes setting the antenna element to place the support parts between the parting faces of the mold in the parting faces, and form a space in a part where the support parts between the parting faces of the mold is not placed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A to FIG. 1E are figures which show the small antenna according to the first embodiment of the present invention, and FIG. 1A to FIG. 1E are a plan view, a front view, a rear view, a left view, and a right view, respectively;

FIG. 2 is a plan view of the conductor pattern used for the first embodiment of the manufacturing method according to the present invention;

FIG. 3A is a horizontal sectional view and FIG. 3B is a vertical sectional view;

FIG. 5A is a front view and FIG. 5B is a bottom view;

FIG. 12A is a plan view, and FIG. 12B is a front view;

Figure 14C:
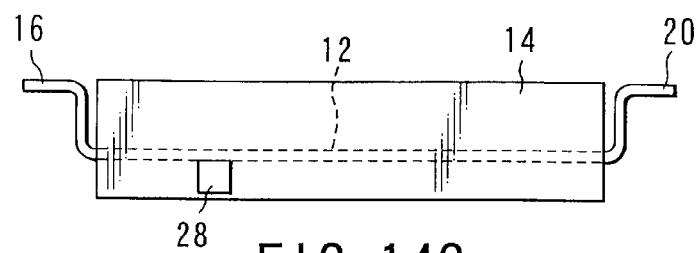
FIG. 14A to FIG. 14E are figures which show the sixth embodiment of the small antenna according to the present invention, FIG.
Figure 14D:
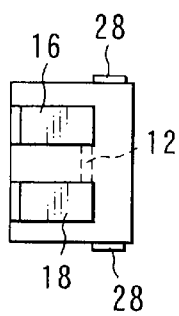
Figure 14A:
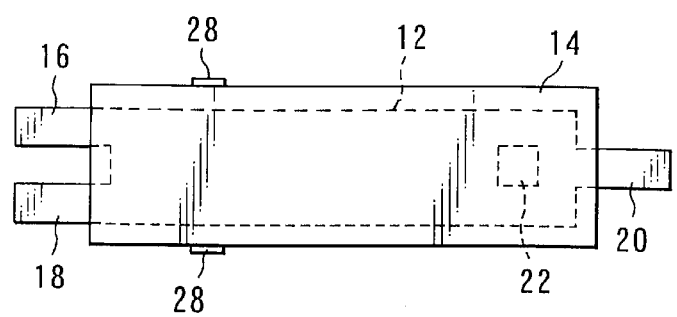
Figure 14E:
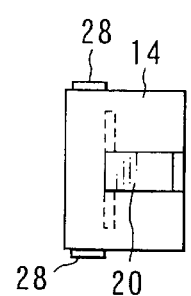
Figure 14B:
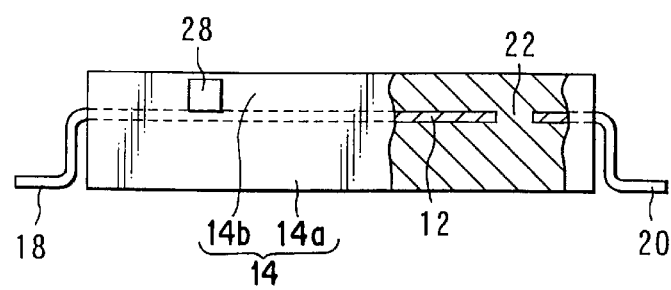

14A is a plan view,

FIG. 14B is a partly cutaway front view,

FIG. 14C is a rear view,

FIG. 14D is a left side view, and

Figure 15:
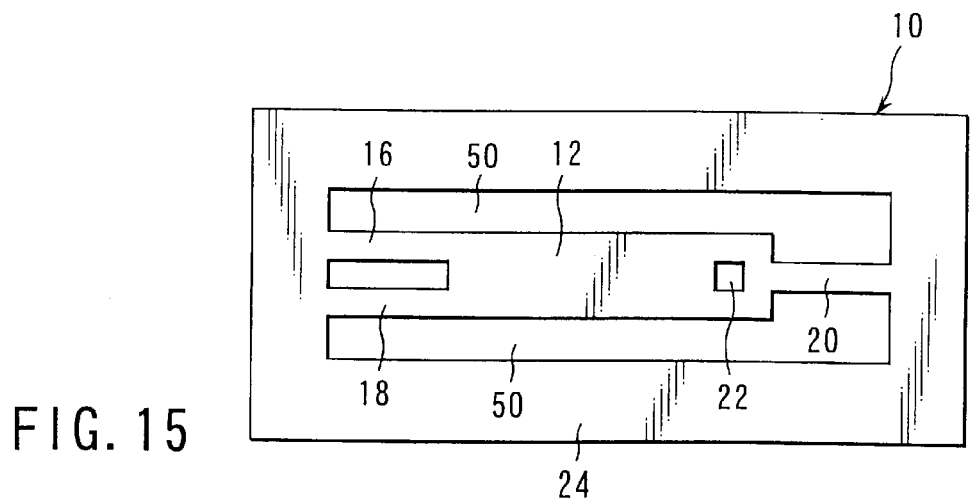
Figure 16A:
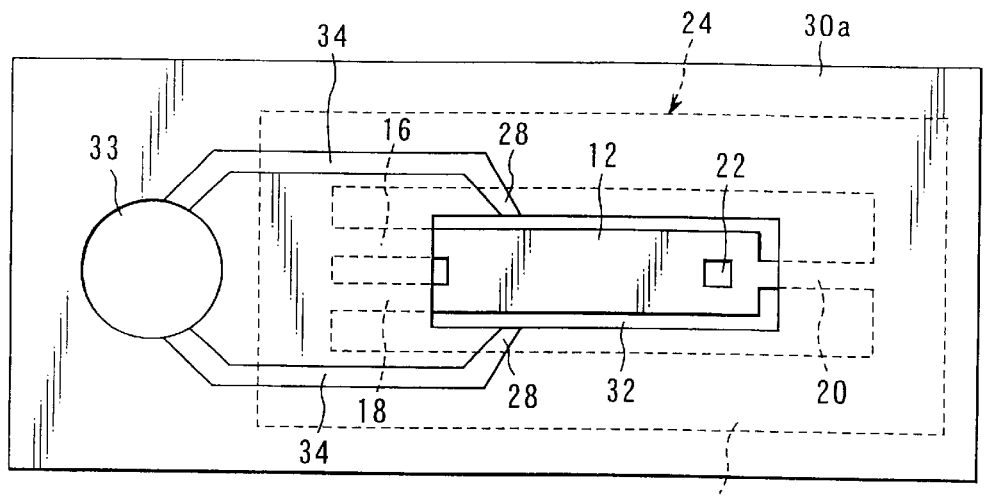
Figure 16B:
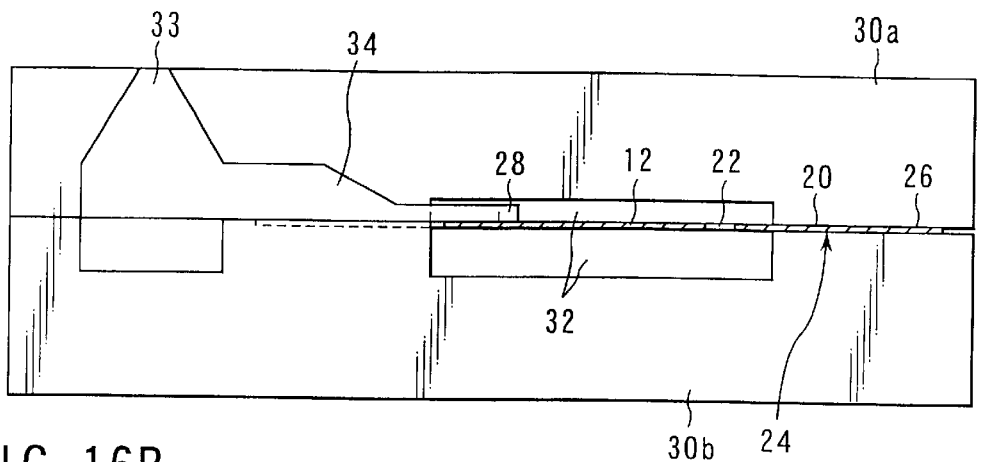
Figure 17:
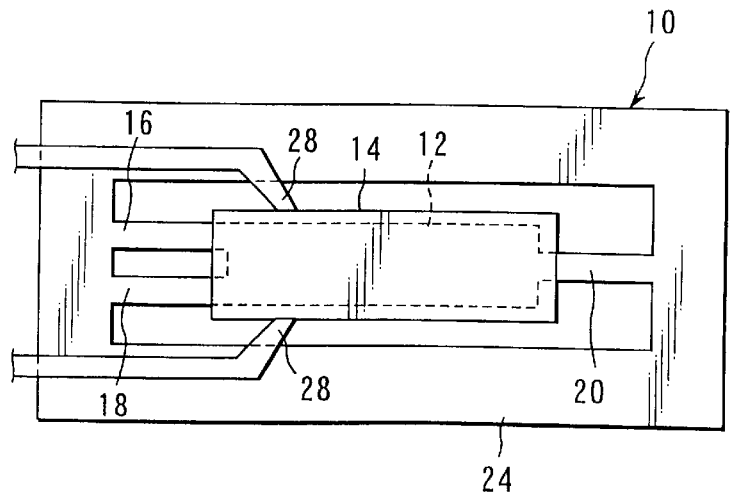
Figure 18C:
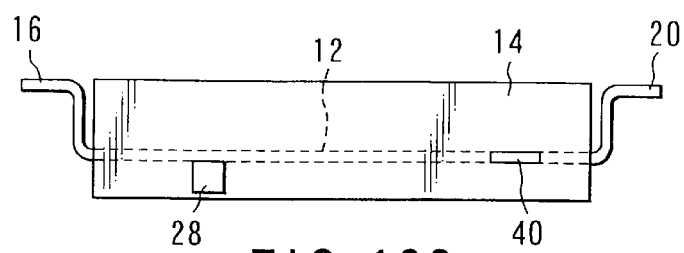
Figure 18D:
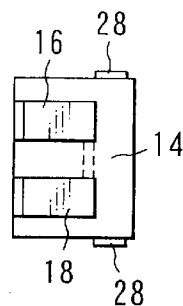
Figure 18A:
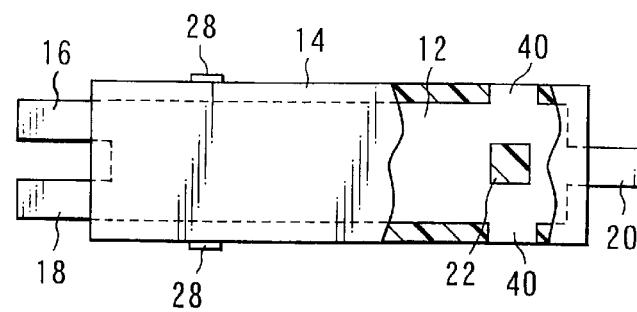
Figure 18E:
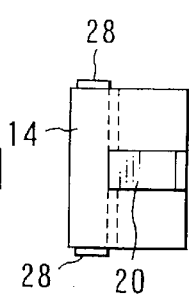
Figure 18B:
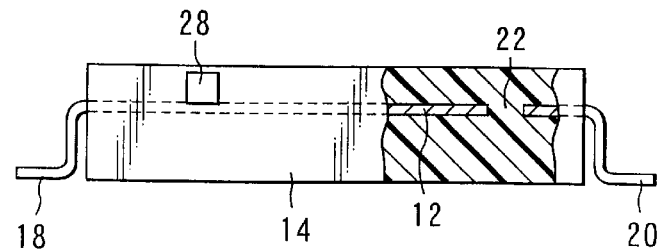
Figure 19:
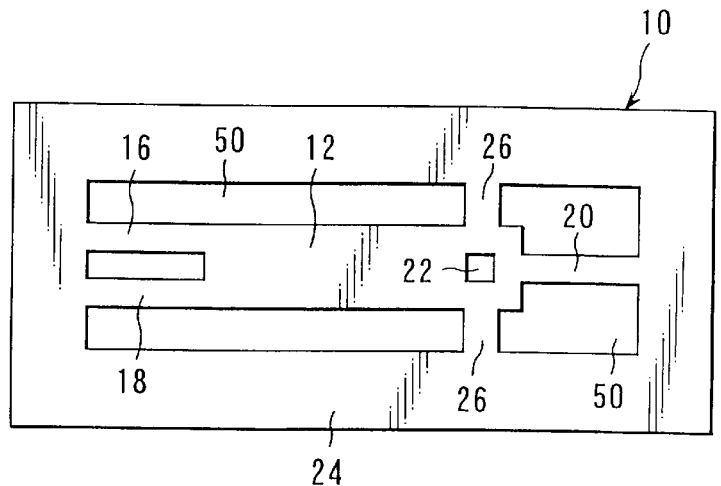
Figures 22A, 22C, 22D:
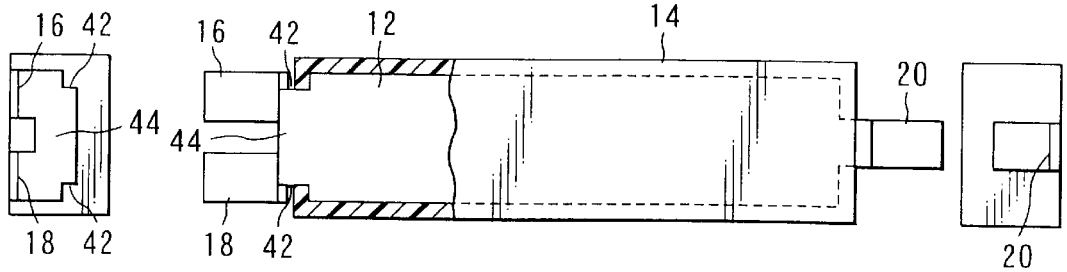
Figure 22B:
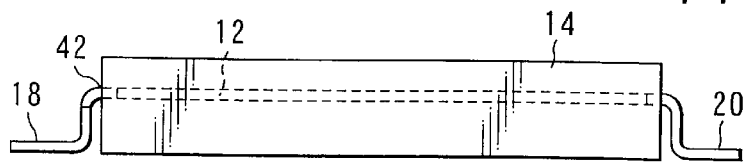
Figure 23A:
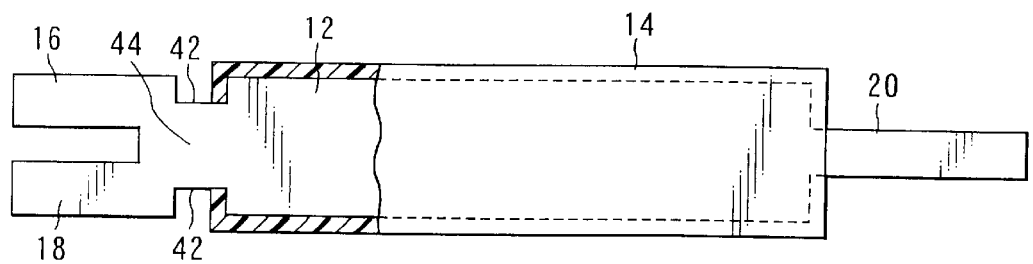
Figure 23B:
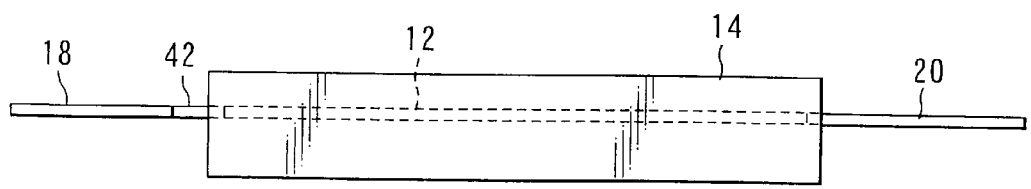
Figure 24A:
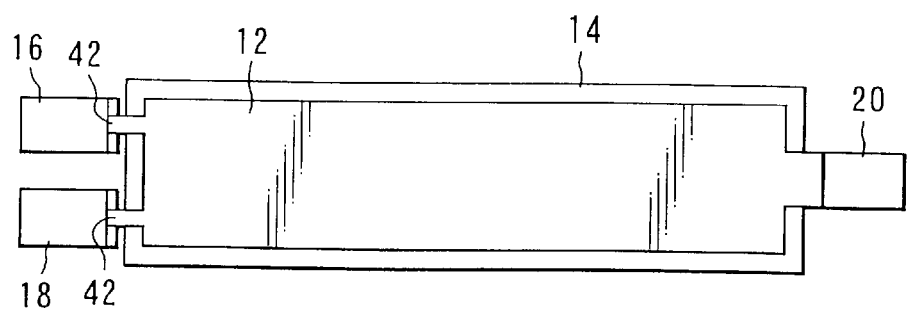
Figure 24B:
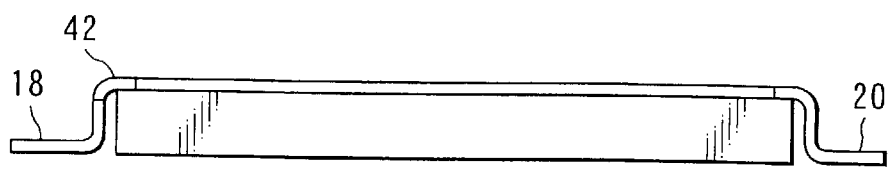
Figure 25:
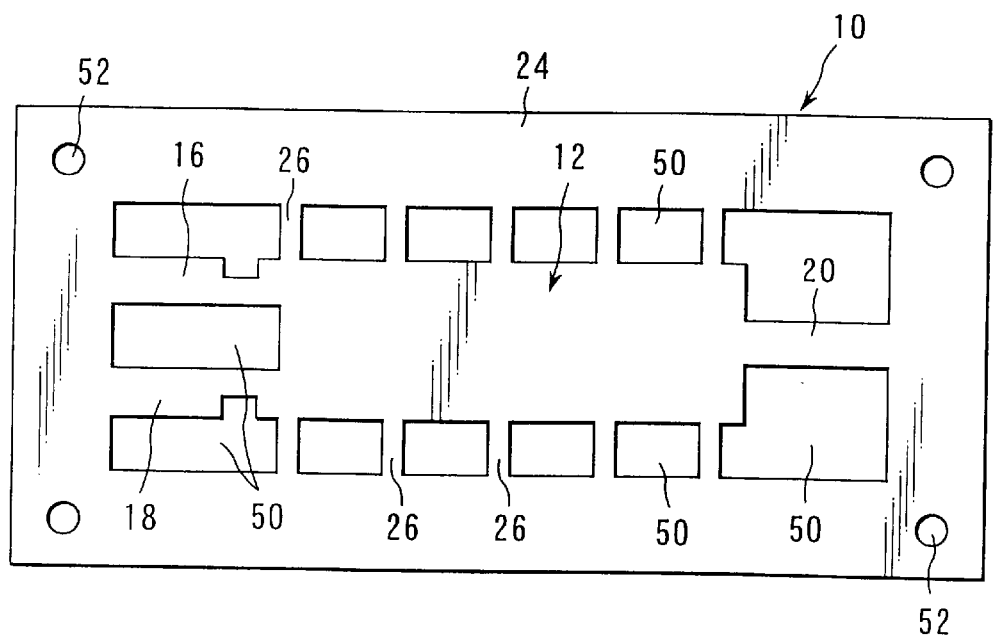
Figure 26:
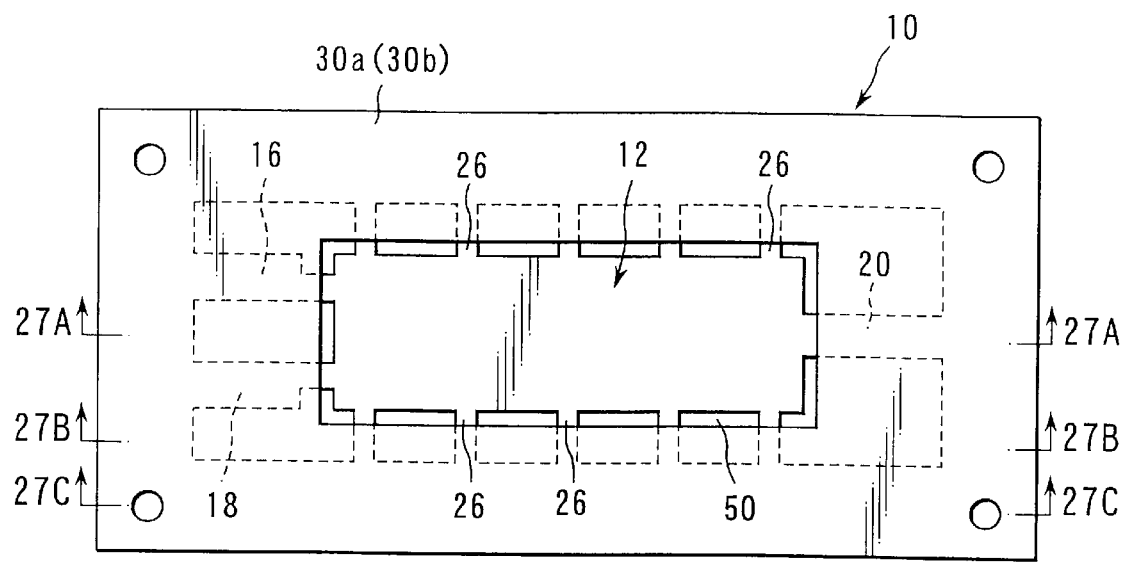
Figure 28:
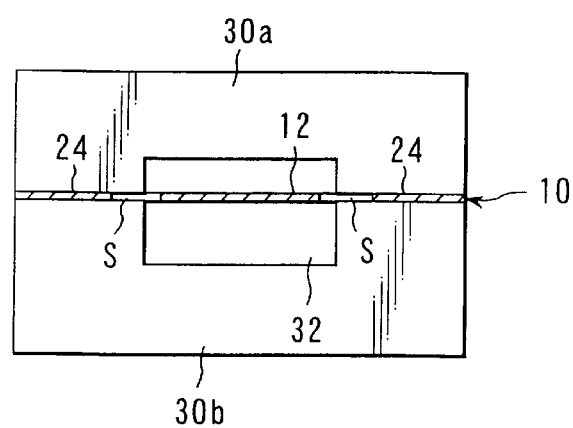
Figure 27A:
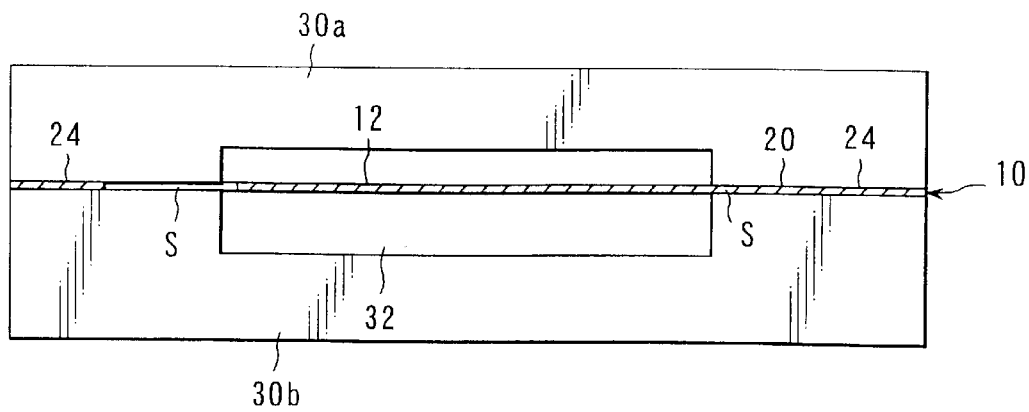
Figure 27B:
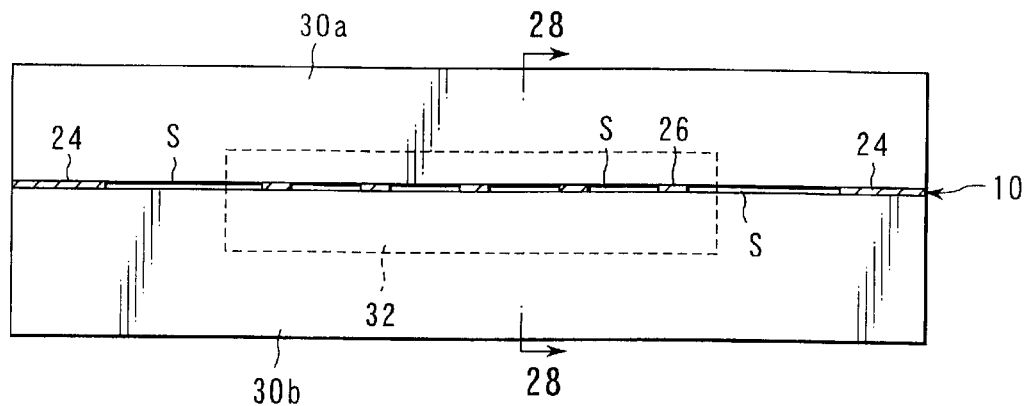
Figure 27C:
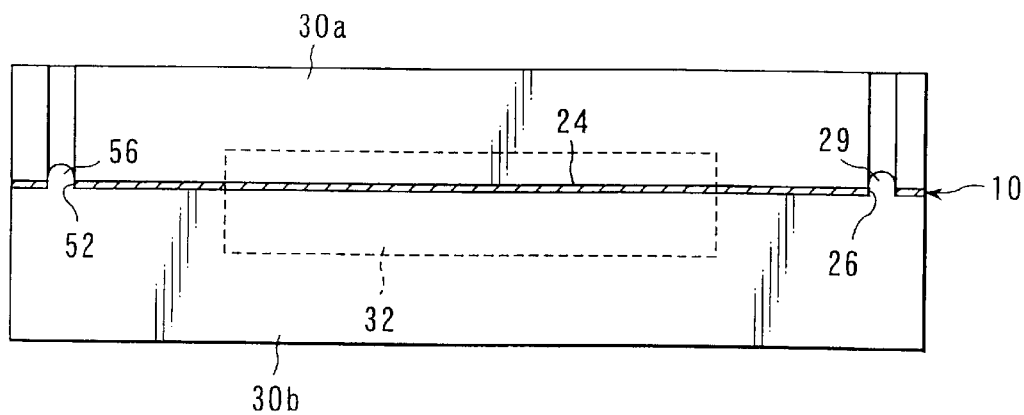
Figure 29:
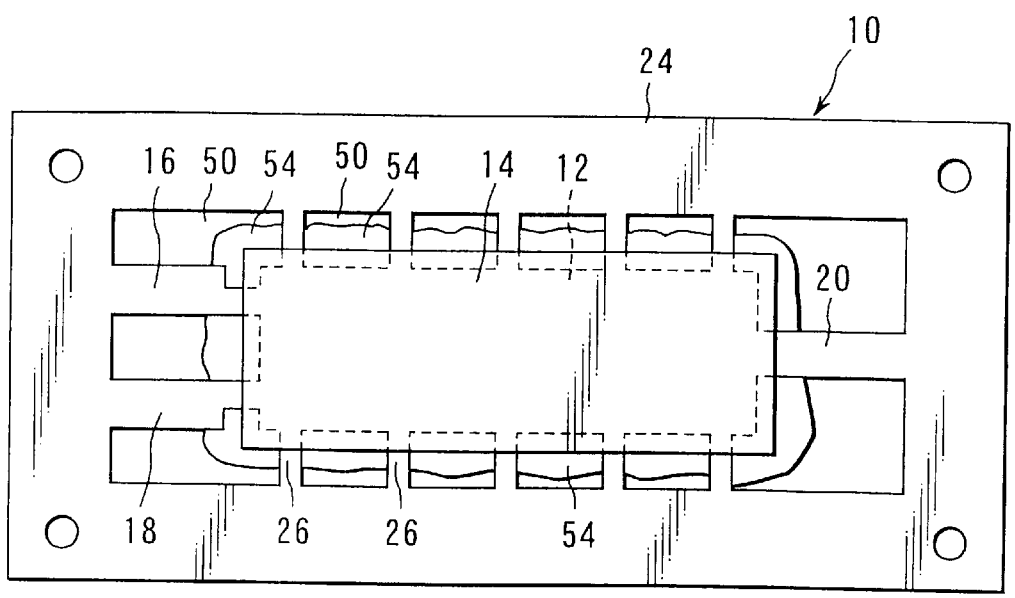
Figure 31:
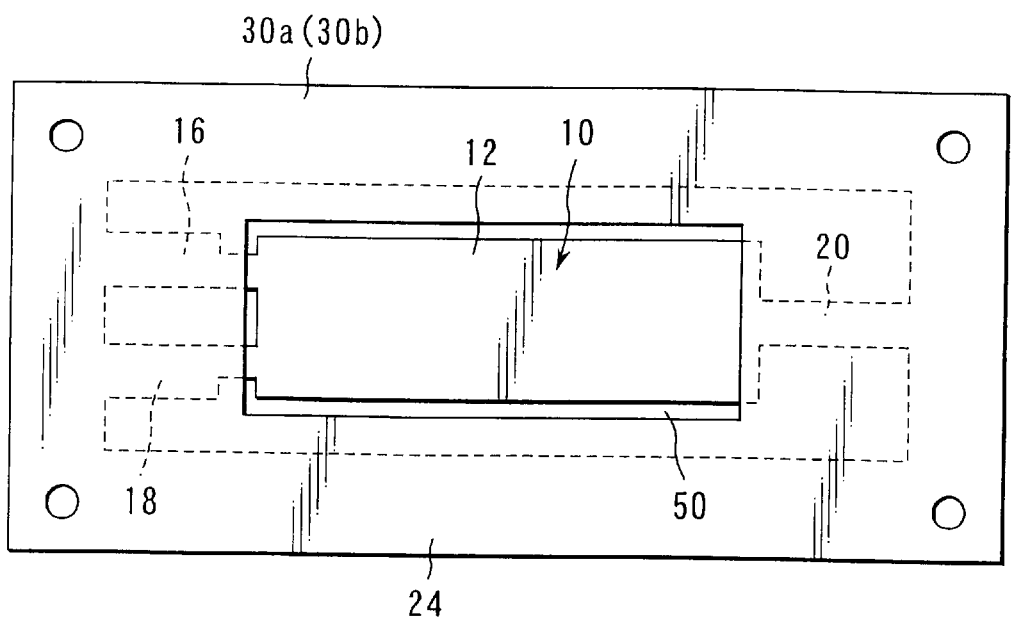
Figure 30C:
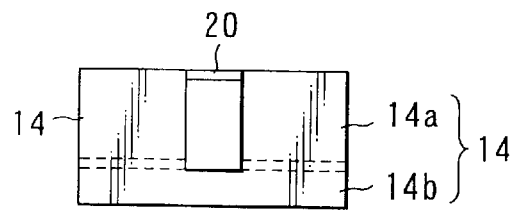
Figure 30A:
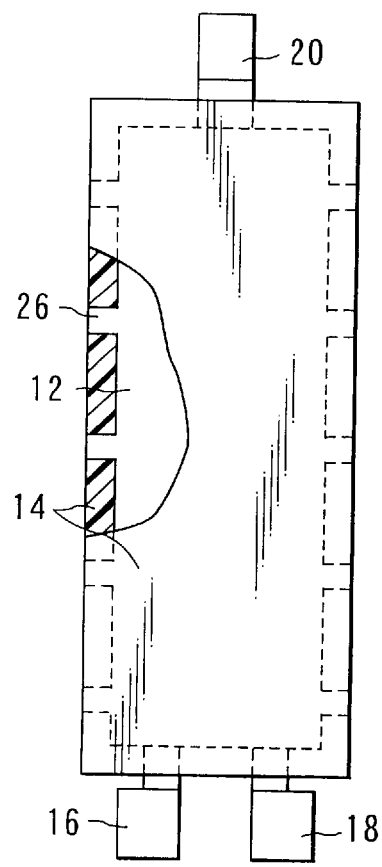
Figure 30B:
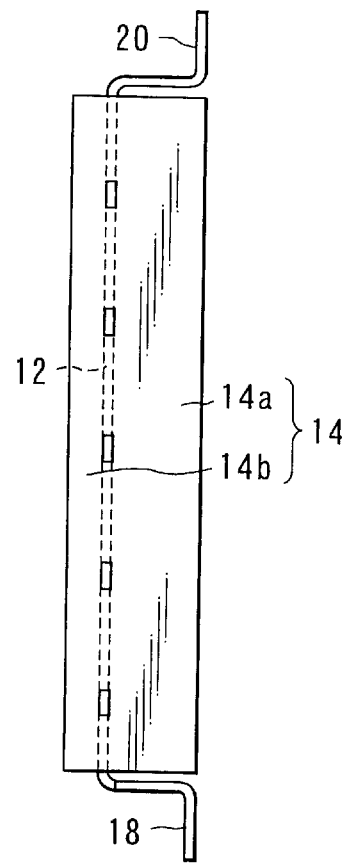
Figure 30D:
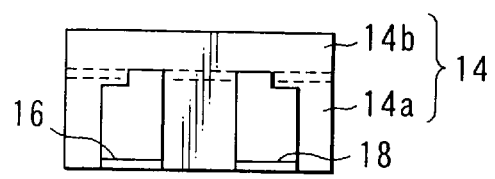
Figure 32:
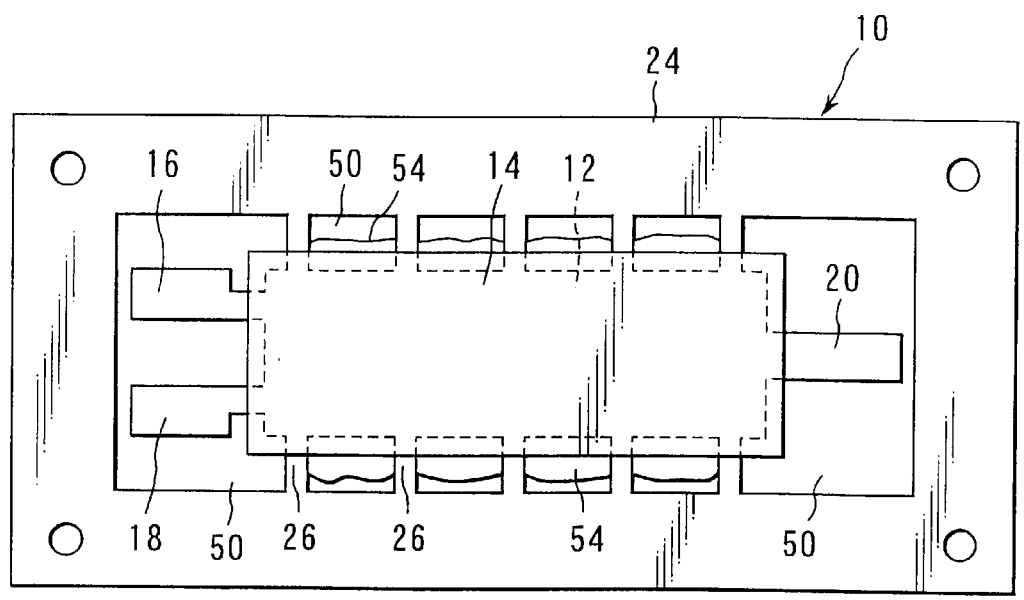
Figure 34:
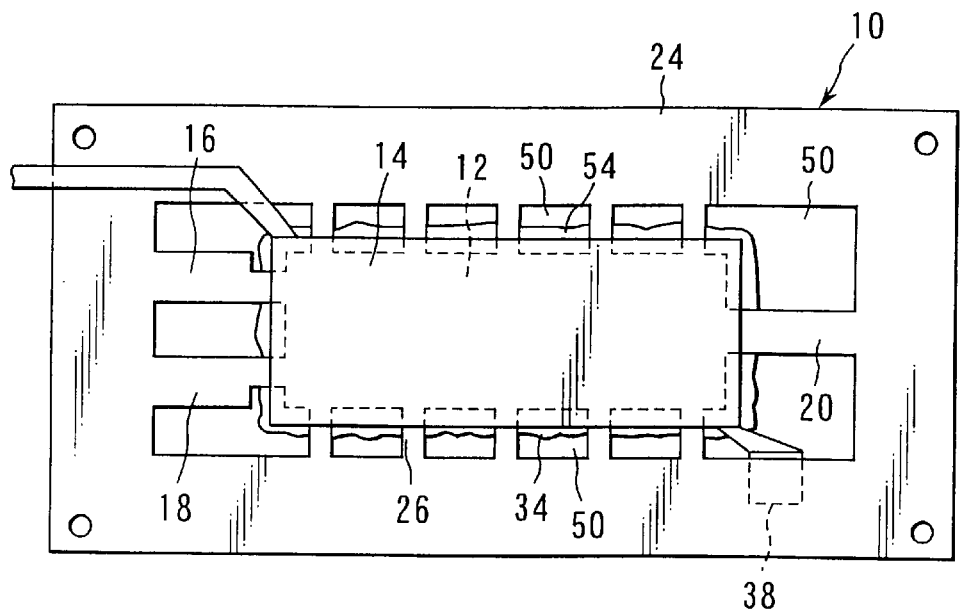
Figure 33A:
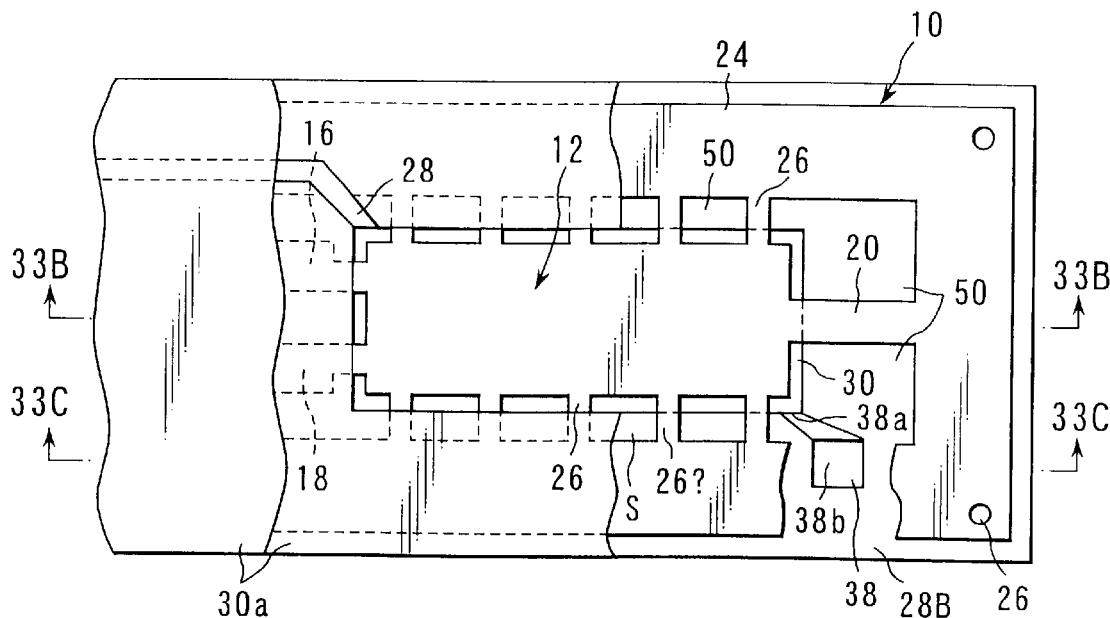
Figure 33B:
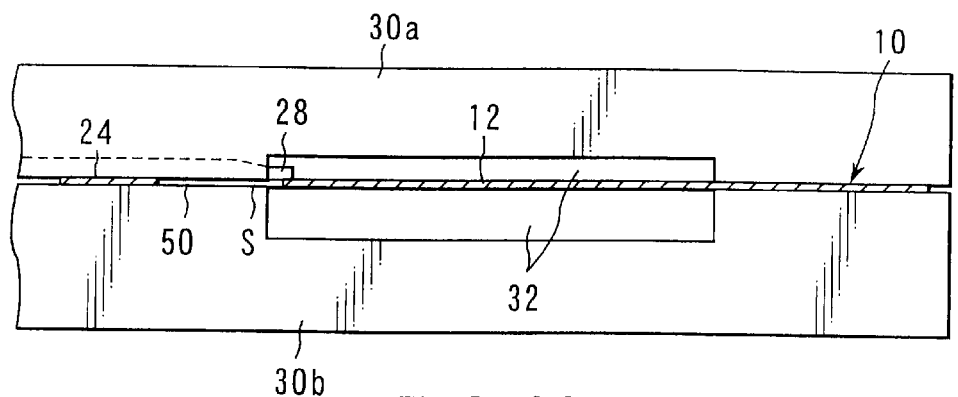
Figure 33C:
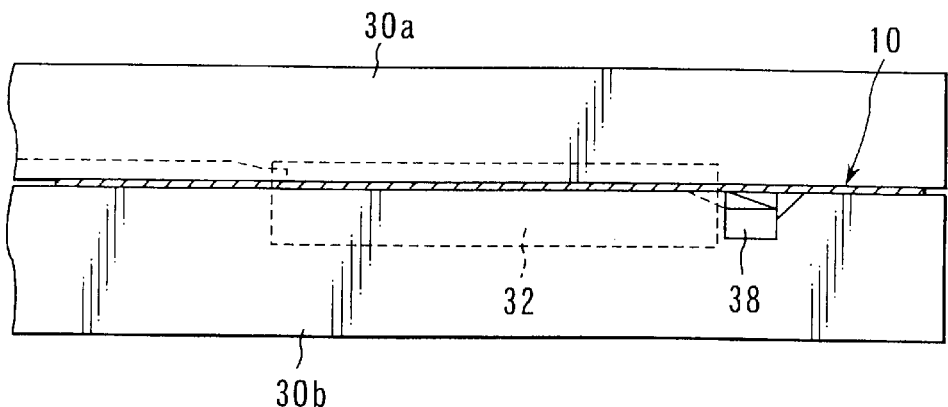
Figure 35A:
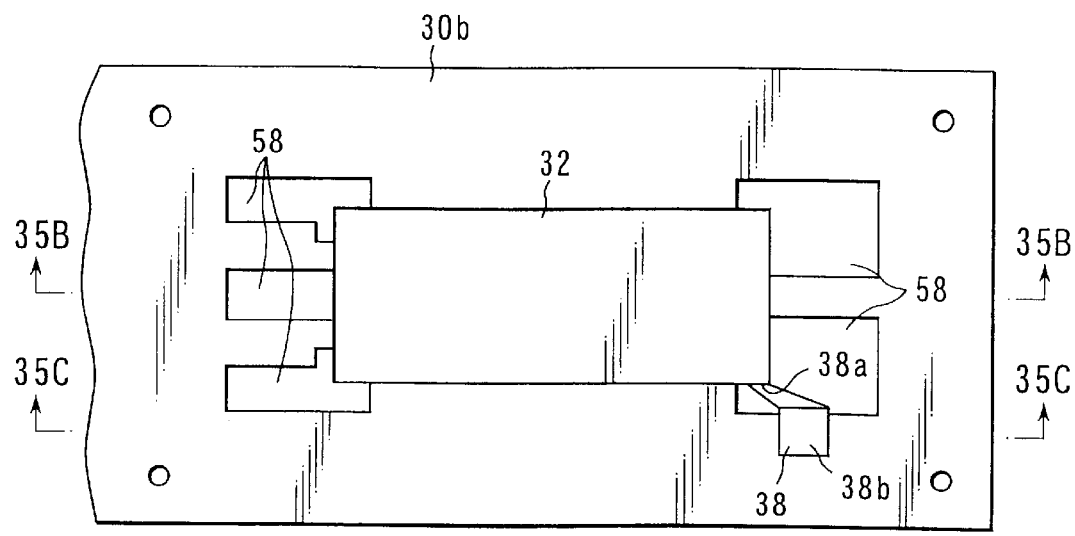
Figure 35B:
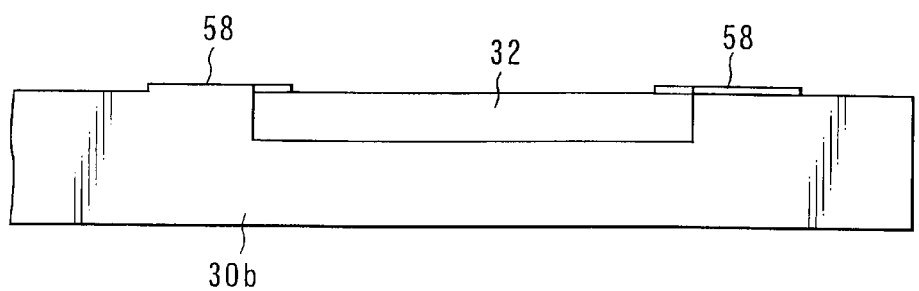
Figure 35C:
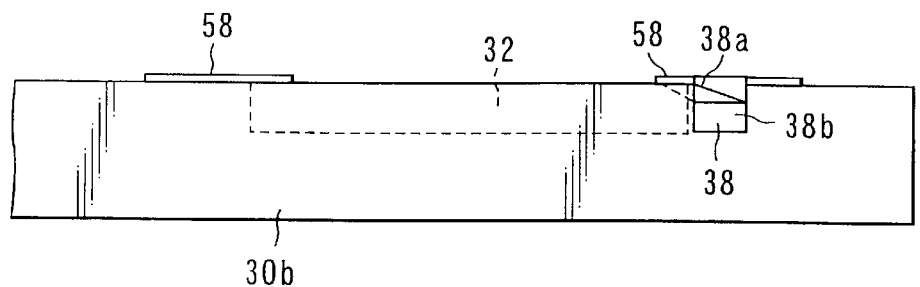
Figure 36:
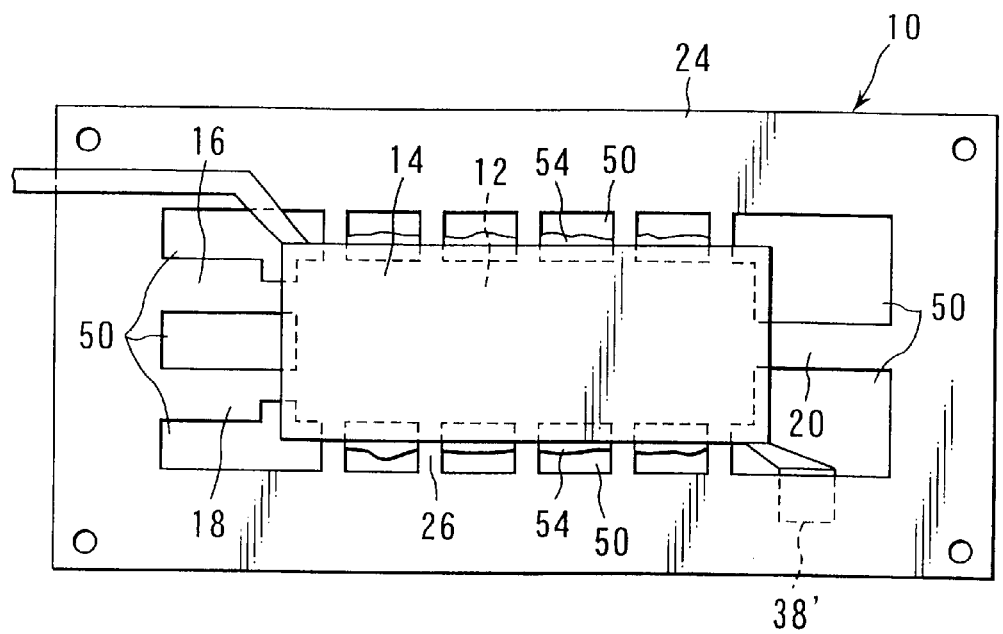
Figure 37:
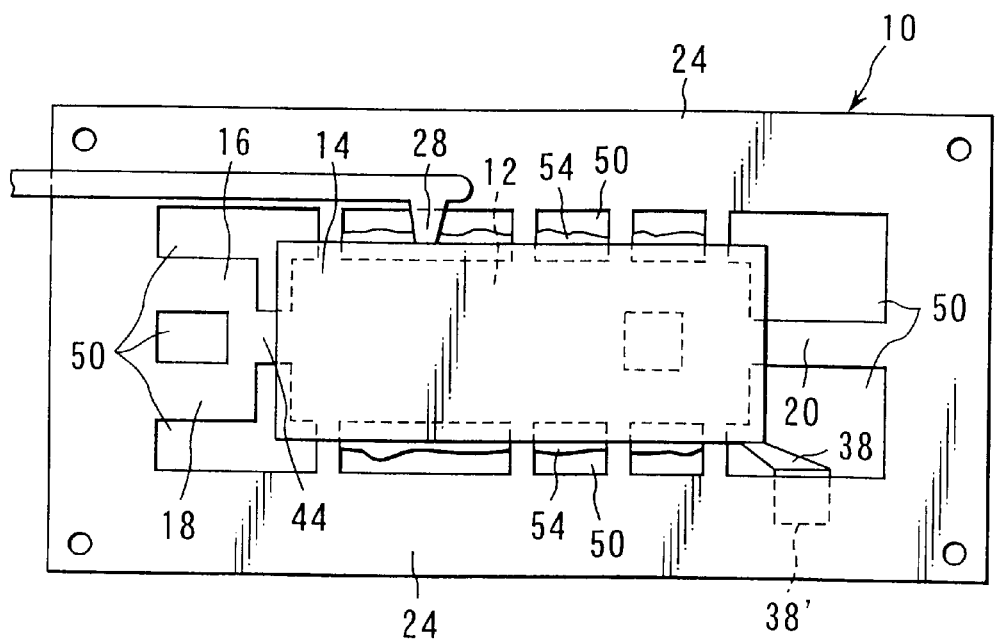
Figure 38:
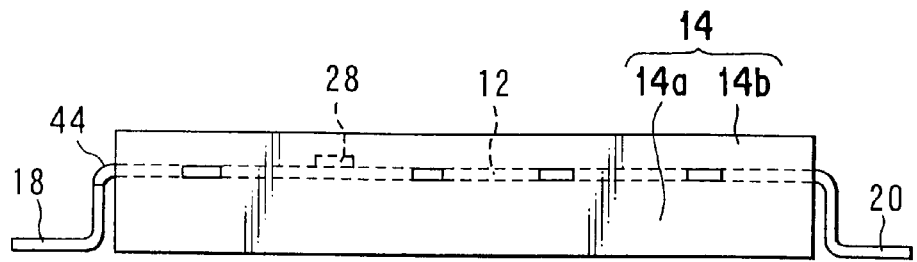
Figure 39:
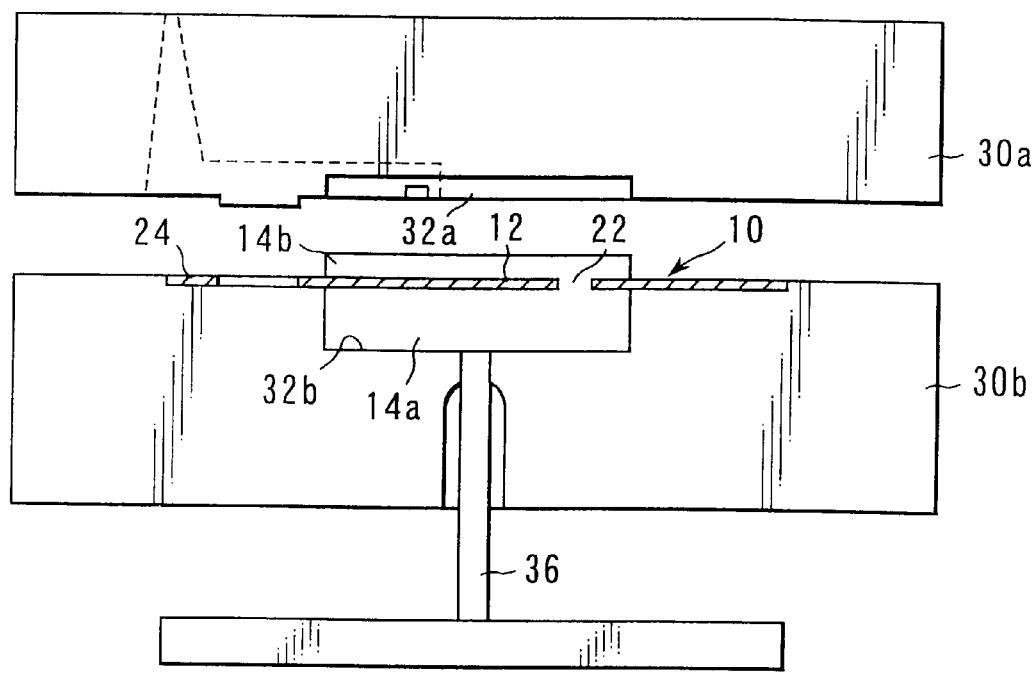

FIG. 14E is a right side view;

FIG. 15 is a plan view which shows the conductor pattern used to manufacture the small antenna of FIG. 14A to FIG. 14E;

FIG. 16A and FIG. 16B are figures which show the state to set the conductor pattern of FIG. 15 in the mold, FIG. 16A is a horizontal sectional view, and FIG. 16B is a vertical sectional view;

FIG. 17 is a plan view which shows the state to take out the molded body from the mold after the resin molding by the mold of FIG. 16A and FIG. 16B;

FIG. 18A to FIG. 18E are figures which show the seventh embodiment of the small antenna according to the present invention, FIG. 18A is a partly cutaway plan view, FIG. 18B is a partly cutaway front view, FIG. 18C is a rear view, FIG. 18D is a left side view, and FIG. 18E is a right side view;

FIG. 19 is a plan view which shows the conductor pattern used to manufacture the small antenna of FIG. 18A to FIG. 18E;

FIG. 20 is a horizontal sectional view which shows the state to set the conductor pattern of FIG. 19 in the mold;

FIG. 21A to FIG. 21D are figures which show the eighth embodiment of the small antenna according to the present invention, FIG. 21A is a partly cutaway plan view, FIG. 21B is a front view, FIG. 21C is a left side view, and FIG. 21D is a right side view;

FIG. 22A to FIG. 22D are figures which show the ninth embodiment of the small antenna according to the present invention, FIG. 22A is a partly cutaway plan view, FIG. 22B is a front view, FIG. 22C is a left side view, and FIG. 22D is a right side view;

FIG. 23A and FIG. 23B are figures which show a half-finished goods in a process of manufacturing the small antenna of FIG. 22A to FIG. 22D, FIG. 23A is a partly cutaway plan view, and FIG. 23B is a front view;

FIG. 24A and FIG. 24B are figures which show the tenth embodiment of the small antenna according to the present invention, FIG. 24A is a plan view, and FIG. 24B is a front view;

FIG. 25 is a plan view of the conductor pattern including the antenna element used for the eleventh embodiment of the present invention;

FIG. 26 is a horizontal sectional view which shows the state to set the conductor pattern of FIG. 25 in the mold;

FIG. 27A to FIG. 27C are sectional views which show a sectional view cut along 27A—27A line, a sectional view cut along 27B—27B line, and a sectional view cut along 27C—27C line in FIG. 26, respectively;

FIG. 28 is a sectional view cut along 28—28 line in FIG. 27B;

FIG. 29 is a plan view which shows the state to take out the resin molded body integrated with the conductor pattern of FIG. 25 from the mold;

FIG. 30A to FIG. 30D are figures which show an example of the small antenna manufactured from the manufacturing method of the present invention, FIG. 30A is a plan view, FIG. 30B is a side view, FIG. 30C is a rear view, and FIG. 30D is a front view;

FIG. 31 is a horizontal sectional view which shows the twelfth embodiment of the present invention in a state of setting the conductor pattern in the mold;

FIG. 32 is a plan view which shows the thirteenth embodiment of the present invention in the state of taking out the resin molded body integrated with the conductor pattern from the mold;

FIG. 33A to FIG. 33C are figures which show the conductor pattern set in the mold according to the fourteenth embodiment of the present invention, FIG. 33A is a subject cutaway plan view, and FIG. 33B is a sectional view cut along 33B—33B line in FIG. 33A and FIG. 33C is a sectional view cut along 33C—33C line in FIG. 33A;

FIG. 34 shows the manufacturing method of FIG. 33A to FIG. 33C and are plan views which show the state to take out the resin molded body integrated with the conductor pattern from the mold;

FIG. 35A to FIG. 35C are figures which show a lower mold used in the fifteenth embodiment of the present invention, FIG. 35A is a plan view FIG, and FIG. 35B is a sectional view cut along 35B—35B line in FIG. 35A and FIG. 35C is a sectional view cut along 35C—35C line in FIG. 35A;

FIG. 36 is a plan view which shows the state to take out the resin molded body which is molded by the mold of FIG. 35A to FIG. 35C and integrated with the conductor pattern, from the mold;

FIG. 37 is an upper view of the small antenna according to the sixteenth embodiment of the present invention immediately after the molding;

FIG. 38 is a side view of the small antenna according to the sixteenth embodiment of the present invention; and FIG. 39 is a figure which shows the method of taking out the small antenna of FIG. 37 from the mold.

DETAILED DESCRIPTION OF THE INVENTION

Hereinafter, embodiments of the present invention will be explained in detail referring to the drawings.

(First Embodiment)

FIG. 1A to FIG. 1E are figures which show the small antenna according to the first embodiment of the present invention. The small antenna according to the first embodiment is an antenna of the surface mounting type in which the planar antenna element 12 is embedded in the resin molded body 14.

Thickness t1 of the resin molded body 14a (called as a, "lower part" for convenience' sake) on the circuit board side of the antenna element 12 (lower side of the antenna element 12 of FIG. 1B) is set in the necessary thickness so that the antenna element 12 is apart from the circuit board not to occur the influence of the characteristic lowering. Thickness t2 of the resin molded body 14b (called as an, "upper part" for convenience' sake) on the other side of the circuit board of the antenna element 12 (upper side of the antenna element 12 of FIG. 1B) is set in as thin as possible than the thickness t1. Thickness t2 is the minimum thickness necessary to protect the antenna element 12, for example. The gate portion 28 of the resin molding is provided to the upper side portion 14b with thin thickness of the resin molded body 14 (t2 side) in the first embodiment. In FIG. 1A to FIG. 1E, there is a case that the mark in this gate portion is actually called the gate portion 28 in this specification though mark 28 of the gate portion is a mark where the gate portion is removed after the resin molding. In FIG. 1A to FIG. 1E, the gate portion 28 is provided on both sides of the resin molded body 14. The gate portion 28 may be provided at one end or both ends of the resin molded body 14. The gate portion 28 is also provided on the upper part 14b in which the thickness of the resin molded body 14 is thinner one (t2 side) in this case.

The antenna element 12 is a rectangle and a planar. The feeder terminal part 16 and the ground terminal part 18 extended outside of the resin molded body 14 are formed on another end of the antenna element 12. The fixed terminal part 20 extended outside of the resin molded body 14 is formed on another end of the antenna element 12. Each of terminal parts 16, 18, and 20 is formed by being bent, so that the surface mounted on circuit board is almost the same level as the bottom of the resin molded body 14. The fixed terminal part 20 is provided if necessary, and might be omitted. A plurality of salients 12a are formed in a suitable interval on the both side ends of the antenna element 12. The resin molded body 14 which covers both sides of the antenna element 12 is integrally formed to continue in a part where there is no salient 12a. It is preferable that the resin molded body 14 which covers both sides of the antenna element 12 is continuously formed in the part without each terminal part 16, 18, and 20 on the both ends of the antenna element 12 as shown in the figure. However, these parts may be discontinuous.

The small antenna of the surface mounting type as shown in FIG. 1A to FIG. BE is manufactured as follows. The conductor pattern 10 as shown in FIG. 2 is formed by piercing processing or etching processing etc. of a metallic thin plate, first. The conductor pattern 10 has the frame 24 which surrounds the antenna element 12 and the circumference thereof. The antenna element 12 is a rectangle and a planar which consists of a metallic plate of about 0.1 mm in thickness, for example. The antenna element 12 and the frame 24 are connected by a plurality of the support parts 26, the feeder terminal part 16, the ground terminal part 18, and the fixed terminal part 20. A plurality of the support parts 26 are formed on the both side ends of the antenna element 12 in a suitable interval. The opening 50 is formed by the piercing processing etc. (The positioning hole for the piercing processing is omitted in the figure).

Figure 3A:
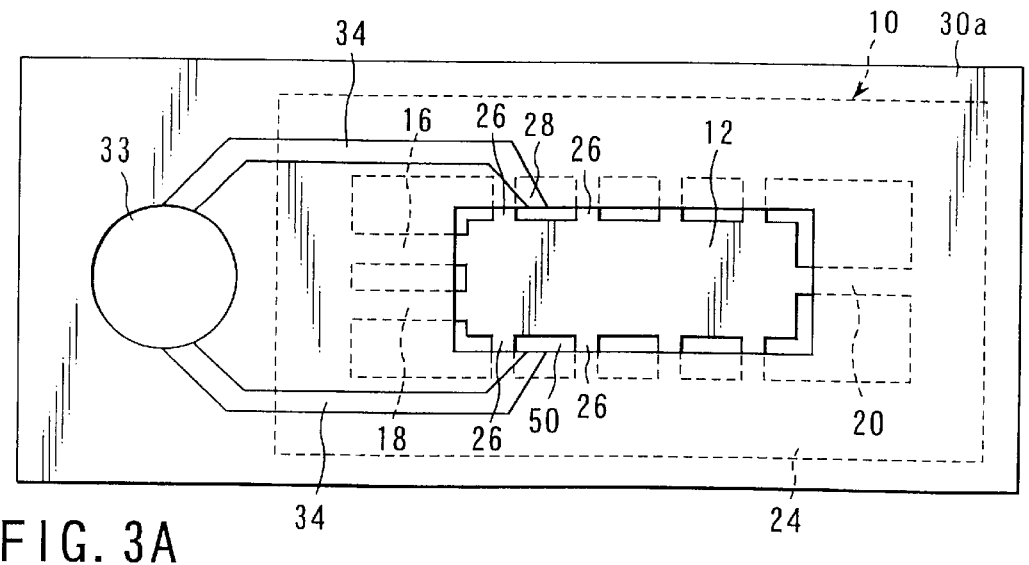
FIG. 3A and FIG. 3B are figures which show the states to set the conductor pattern of FIG. 2 in the mold.
Figure 3B:
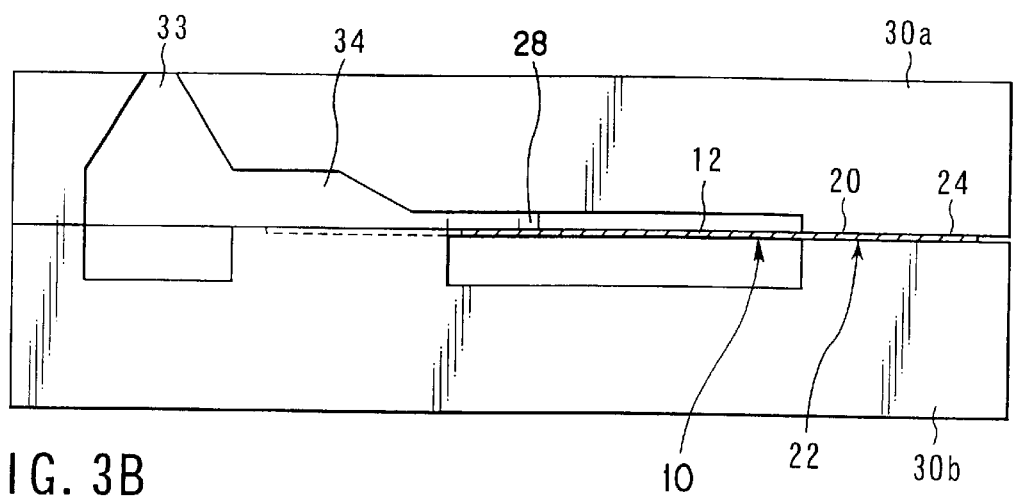

Next, the conductor pattern 10 is set in the molds 30a and 30b as shown in FIG. 3A and FIG. 3B. That is, the frame 24, the outside end side of each the support parts 26 and the outside end sides of each of terminal parts 16, 18 and 20 are placed in the parting faces of the upper mold 30a and the lower mold 30b. The conductor pattern 10 is set so that the entire antenna element 12, a part of end side in each the support part 26 and a part of end side in each terminal part 16 and 18 and 20 are positioned in the cavity of the upper and lower molds 30a and 30b. To the upper mold 30a to mold the resin to the upper of the antenna element 12 (another side of the circuit board), the depth of the cavity (Correspond to the thickness of the resin molded body) is shallowly formed with the lower mold 30b to mold the resin under the antenna element 12 (circuit board side). The resin flows easily into deeper side of the cavity usually when the depth of the cavity is different because of both sides of the antenna element 12 like this. Therefore, the resin pressure becomes unbalanced on both sides of the antenna element 12, and the deformation is occurred easily in the antenna element 12. The first embodiment solves this respect by providing the spool 33, the runner 34, and the gate 28 for the resin injection to the upper mold 30a side. Especially, it is preferable that the gate 28 is provided to be located to the opening 50 between the support parts 26 of the conductor pattern 10.

Thus, it becomes possible to supply the resin enough also to the upper part of the antenna element 12 into which the resin does not flow easily. Therefore, since the balance of the resin pressure is not kept off greatly on both sides of the antenna element 12, the deformation of the antenna element 12 can be controlled.

Figure 4:
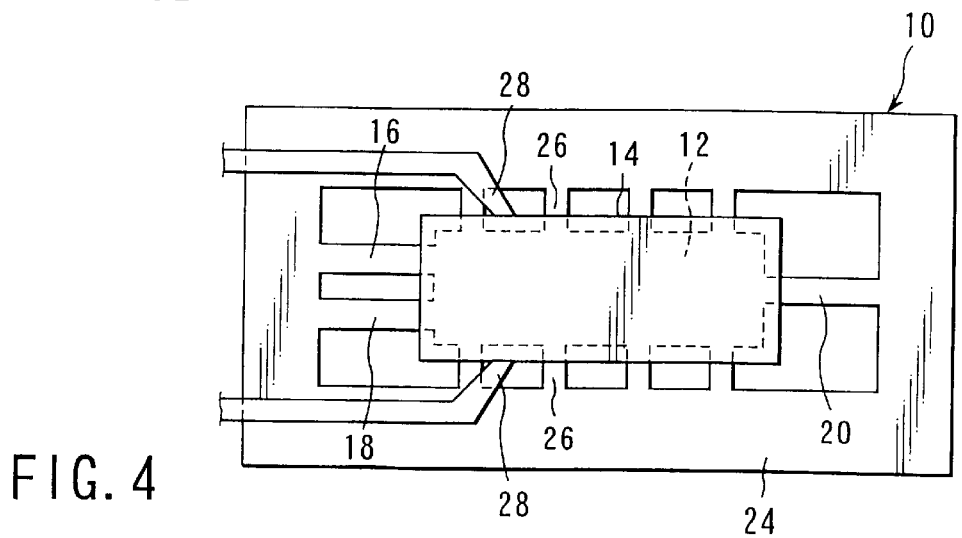
FIG. 4 is a plan view which shows a state to take out the resin molded body integrated with the conductor pattern of FIG. 2 from the mold.

It becomes the state that the antenna element 12 is embedded in the resin molded body 14 as shown in FIG. 4 if the molds 30a and 30b are opened after the resin molding and the resin molded body integrated with the conductor pattern 10 is taken out. After the support parts 26 and the gate portion 28 are cut according to both sides of the resin molded body 14. In addition, the outside end of each of terminal parts 16, 18, and 20 is cut off from the frame 24 and is bent. In FIG. 1A to FIG. 1E, the salient 12a is a remaining part after the support parts 26 is cut off in the resin molded body 14.

(Second Embodiment)

Figure 5A:
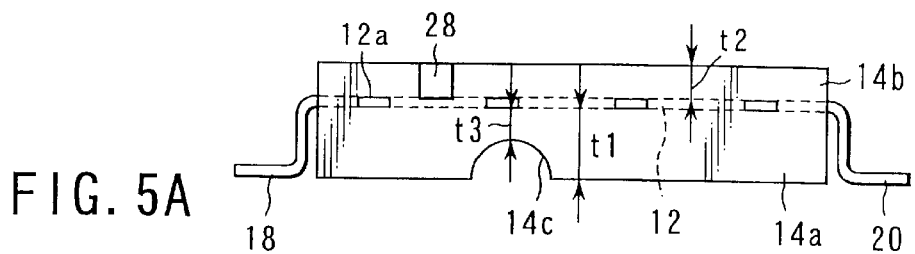
FIG. 5A and FIG. 5B are figures which show the second embodiment of the small antenna according to the present invention.
Figure 5B:
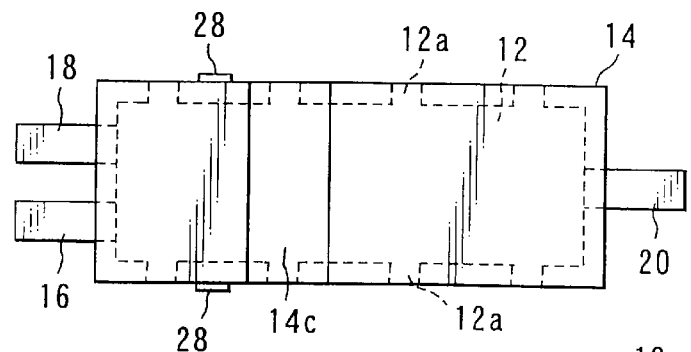

FIG. 5A and FIG. 5B are figures which show the second embodiment of the present invention. The point where the second embodiment is different from the first embodiment is to form the part 14c whose thickness is thin at a part of the lower part 14a of the resin molded body.

The part 14c whose thickness is thin is formed with the trench having the semicircle section formed over total length of the width direction of the antenna. Thickness t3 of the thinnest part of the part 14c whose thickness is thin is set to almost the same thickness as the thickness of the upper part 14b of the resin molded body.

In a small antenna according to the second embodiment, the part 14c whose thickness is thin is formed in the part of the lower part 14a of the resin molded body. Therefore, the resin flowing to the lower part 14a of the resin molded body can be limited more by the part 14c. As a result, the pressure balance when the lower part 14a and the upper part 14b of the resin molded body are molded becomes more excellent. Therefore, the antenna element 12 can be prevented from being deformed.

The mark (gate portion) after the gate is cut may be in the same surface as the side surface of the resin molded body 14, may be projected or may be recessed as shown in FIG. 1A to FIG. 1E.

(Third Embodiment)

Figure 6:
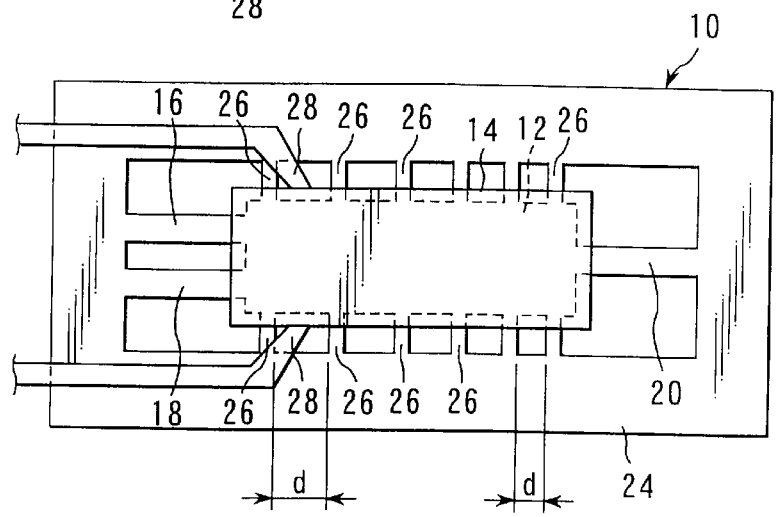
FIG. 6 is a figure which shows the third embodiment of the manufacturing method of the small antenna according to the present invention.

FIG. 6 is a figure which shows the third embodiment of the manufacturing method of the small antenna according to the present invention. In the third embodiment, an interval d of a plurality of the support parts 26 which connect the antenna element 12 located in the cavity of the mold and the frame 24 which is held and fixed by the mold at the circumference thereof is wider at the position of the gate (position of gate part 28) and becomes narrow while being apart from the gate. Besides, the same marks are fixed to the same parts of FIG. 4, and a detailed explanation will be omitted since it is the same as the manufacturing method explained in the first embodiment. According to the third embodiment, the resin filling pressure which is applied in the vicinity of the gate is easily spread to the lower mold 30b (FIG. 3A and FIG. 3B) side and the resin injection in the cavity of the lower mold 30b is promoted. Therefore, the unbalance of the resin pressure which is applied to the upper and lower sides of the antenna element 12 from the filling finality step to the pressure-maintaining step is relaxed. Therefore, the antenna element 12 can be prevented from being deformed by the resin pressure of the antenna element 12.

(Fourth Embodiment)

Figure 7:
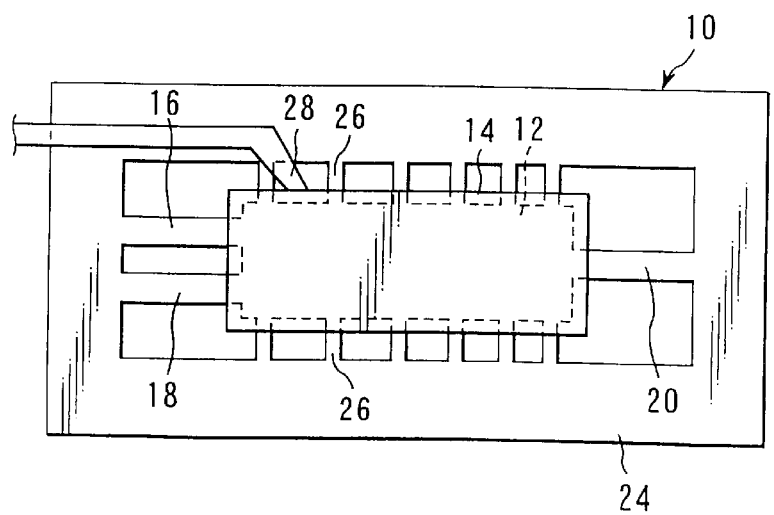
FIG. 7 is a figure which shows the fourth embodiment of the manufacturing method of the small antenna according to the present invention.

FIG. 7 is a figure which shows the fourth embodiment of the manufacturing method of the small antenna according to the present invention. The gate (corresponding to the gate portion 28) is provided (In a word, only one gate is provided) only to the one side of the cavity in the fourth embodiment. And, the resin molded body 14 is formed by filling the resin from one gate. Besides, it is the same as the third embodiment. The opportunity that the flow of the resin injected thus at the injection molding intersects decreases. Therefore, the generation of the weld is suppressed, and the strength of the resin molded body can be improved.

In each above-mentioned embodiment, though the example of providing the gate only on the upper mold 30a side is explained, the gate may be provided at the lower mold 30b if necessary.

According to the first to the fourth embodiments, the thickness of the resin molded body is thinned on the side of the other side (the upper part 14b) than on one side of the antenna element (the lower part 14a). As a result, it is possible to thin and miniaturize the resin molded body. In addition, the gate portion of the resin molding is provided to another side of the antenna element, that is, to thinner side of the resin molded body. As a result, the small antenna whose deformation of the antenna element is a little, and whose characteristic is even, can be obtained.

(Fifth Embodiment)

Figure 8:
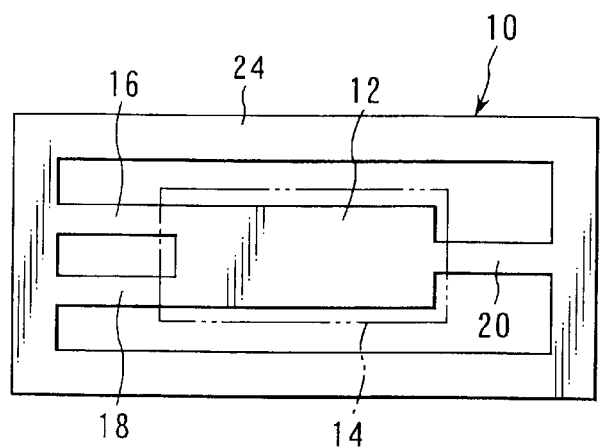
FIG. 8 is a plan view which shows an example of the antenna element used for the fifth embodiment of the present invention.

FIG. 8 is a plan view which shows an example of the antenna element set in the mold. In the fifth embodiment, the same marks are fixed to the same parts as the first embodiment, and a detailed explanation will be omitted. The thickness of the resin molded body is thinner in another side of the antenna element than in one side thereof in the fifth embodiment as well as the first to fourth embodiments.

Figure 9:
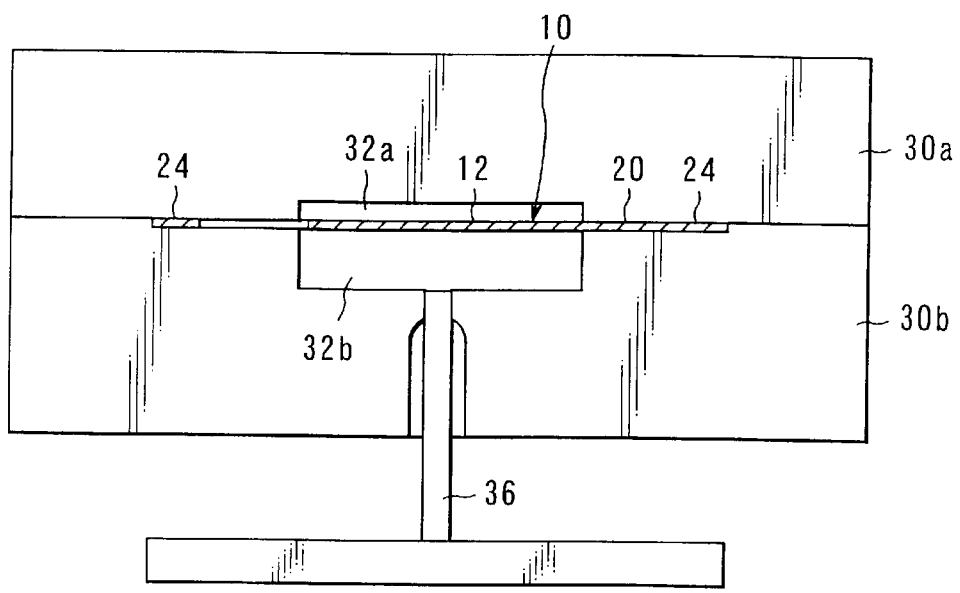
FIG. 9 is a sectional view which shows the state to set the antenna element in the mold in the fifth embodiment of the present invention.

In the fifth embodiment, the antenna element 12 is set in the molds 30a and 30b for injection molding as shown in FIG. 9 first as well as the first embodiment. In this case, since the thicknesses of the upper and lower surface of the antenna element 12 of the resin molded body are different, the cavity 32b of the lower mold 30b is deeply formed with the cavity 32a of the upper mold 30a. The projection pin 36 to take out the resin molded body is provided to the lower mold 30b.

Figure 10:
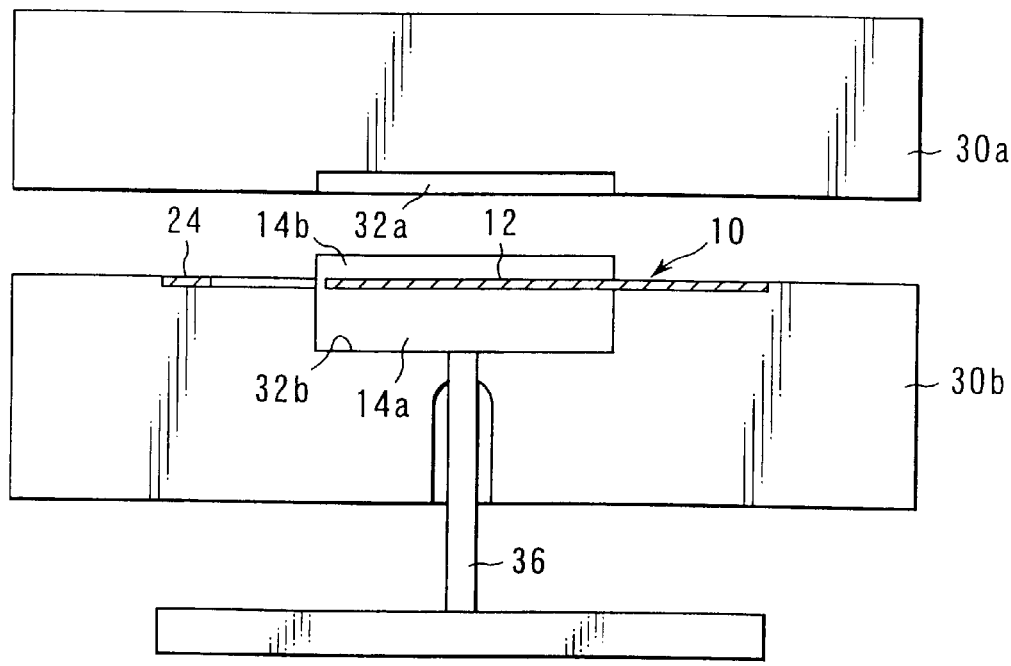
FIG. 10 is a sectional view which shows the state to open the mold after injection molding in the fifth embodiment of the present invention.
Figure 11:
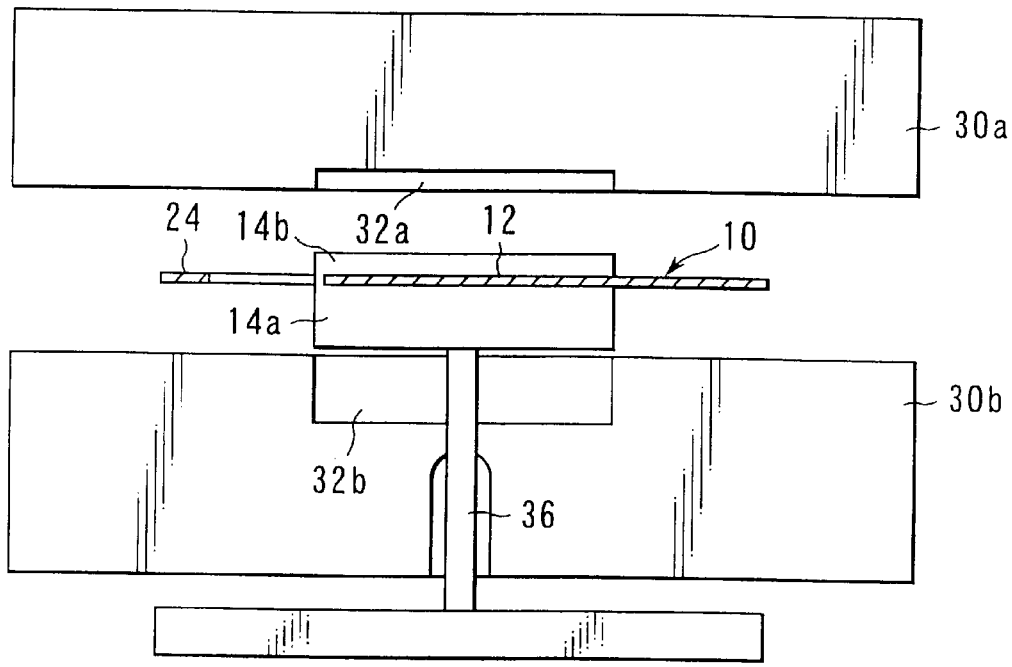
FIG. 11 is a sectional view which shows the state to take out the resin molded body from the mold in the fifth embodiment of the present invention.

In the configuration as mentioned above, the injection molding is performed by injecting the dielectric material in the cavity 32 in the state of FIG. 9. After molding, the molds 30a and 30b are opened as shown in FIG. 10. The ejector pin 36 is projected as shown in FIG. 11, and the resin molded body 14 is taken out from the lower mold 30b. At this time, the ejector pin 36 pierces thicker side of the resin molded body 14 (with large strength, that is, lower part 14a). Therefore, even if the ejection speed of the ejector pin 36 is made fast, fear that the crack is generated in the resin molded body 14 and the deformation is occurred in the antenna element is a little.

Figure 12A:
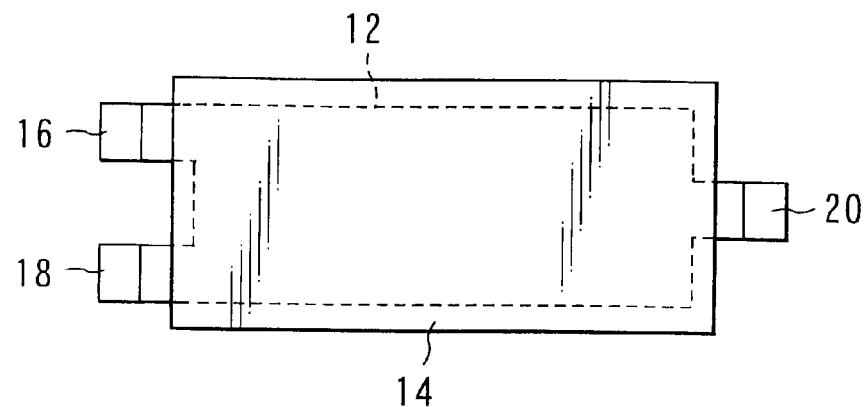
FIG. 12A and FIG. 12B are figures which show the small antenna manufactured in the fifth embodiment of the present invention.
Figure 12B:
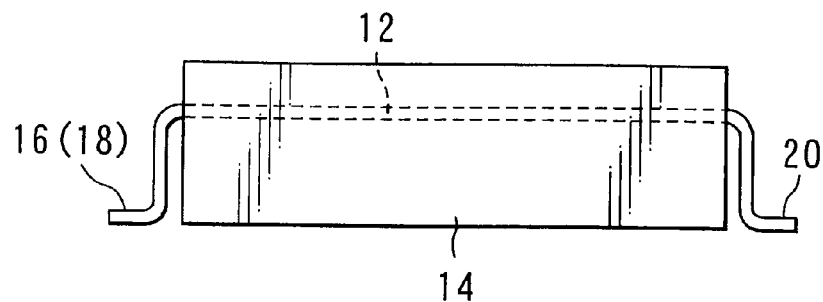

Thereafter, the outside end of each of terminal parts 16, 18, and 20 is cut off from the frame 24 and is bent. As a result, the small antenna shown in FIG. 12A and FIG. 12B is finally obtained. The small antenna manufactured like this has the incrustation of the projection pin under the resin molded body 14. However, the upper middle part of the resin molded body 14 sucked by the mounter becomes a smooth surface to which the mold surface is transferred. Therefore, there is no fear of the air leakage at picking-up, and the pickup mistake can be reduced.

Figure 13:
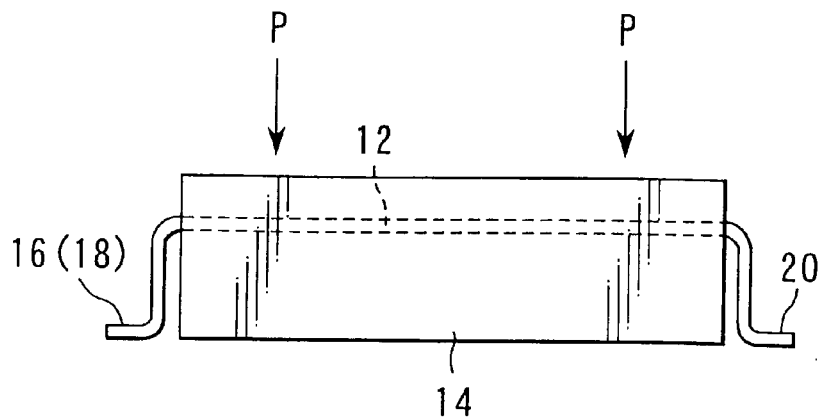
FIG. 13 is a figure which shows the modification of the fifth embodiment of the present invention, and is an explanation figure which shows the projection position of the projection pin.

As described above, in the fifth embodiment, the projection pin is struck and ejected at lower surface (the lower part 14a) of the resin molded body when the resin molded body is taken out from the mold. The projection pin may be struck to the position where an upper position of arrow P, that is, the position avoiding the middle part as shown in FIG. 13 to prevent the pickup miss and the resin molded body may be ejected, when the projection pin is struck to the resin molded body and the resin molded body is taken out.

The thicknesses of the resin molded body on both sides of the antenna element are deferent as well as the first embodiment, and the ejector pin is struck to the surface of the lower part 14a of the resin molded body and the resin molded body is ejected according to the fifth embodiment. Therefore, the strength of the resin molded body on the side where the ejector pin is struck increases. As a result, since it becomes possible to endure more high-speed projection operation, the production efficiency can be improved.

When the mold is opened and the resin molded body is taken out, the ejector pin is struck to the position where an upper middle part of the resin molded body is avoided and the resin molded body is ejected according to the fifth embodiment. Therefore, the position sucked by the mounter becomes a flat surface without the incrustation of the ejector pin in the small antenna manufactured from the manufacturing method according to the fifth embodiment. As a result, there is no fear of the air leakage when picking-up, and the pickup mistake can be reduced.

(Sixth Embodiment)

FIG. 14A to FIG. 14E is a figure which shows the sixth embodiment of the present invention. In the sixth embodiment, the same marks are fixed to the same parts as the first embodiment, and a detailed explanation will be omitted.

The gate part 28 is provided near the end portion inclined to (in other rectangular example of shown in the figure of inclined to it of the end portion of the antenna of element 10 on terminal 16 and 18 sides). In the small antenna according to the sixth embodiment, the hole 22 is provided to the vicinity of the end portion (end portion on a fixed terminal 18 side in the example shown in the figure) far from the gate portion 28 of the resin molded body 14 of the antenna element 12. The resin on both sides of the antenna element 12 is continuous (integrated) in the hole 22. The deformation in the vicinity of the end portion far from the gate portion 28 of the antenna element 12 can be controlled with such a structure (details are described later). The hole 22 is formed at the middle of the width direction of the antenna element 12.

A small antenna as shown in FIG. 14A to FIG. 14E is manufactured as follows. First, the conductor pattern 10 shown in FIG. 15 is formed by piercing processing or etching processing of a metallic thin plate. The conductor pattern 10 has a rectangular planar antenna element 12 and a frame 24 which surrounds the circumference thereof. The antenna element 12 and the frame 24 are connected by the feeder terminal part 16 and the ground terminal part 18 formed on one end of the antenna element 12, and the fixed terminal part 20 formed on another end of the antenna element 12. The hole 22 is formed in the vicinity of the end portion of the antenna element 12 at the fixed terminal part 20 sides. The opening 50 is formed by the piercing processing etc. (the positioning hole for piercing processing is omitted in the figure).

Next, the conductor pattern 10 is set in the molds 30a and 30b for injection molding as shown in FIG. 16A and FIG. 16B, etc. as well as the first embodiment. The gate is provided to an upper side of the antenna element 12 in this embodiment.

When the resin is injected into the molds 30a and 30b in the state of FIG. 16A and FIG. 16B, the resin which entered in the cavity 32 from the gate 28 is rapidly filled in the cavity 32, and flows on an upper side and a lower side of the antenna element 12. And, the flow of the resin changes greatly at the place where the front of the flow of the resin strikes the wall of the cavity 32 far from the gate 28. Especially, when the depths of the cavity 32 (thickness of the resin) are different at the upper and the lower sides of the antenna element 12 shown in the sixth embodiment, the injection pressure and flow velocity of the resin at the upper and the lower sides of the antenna element 12 are different. Therefore, the reach time of the resin to the cavity end portion far from the gate 28 is also different. Therefore, the change of the flow of the resin is enlarged at the cavity end portion far from the gate 28. However, if the hole 22 is formed to the antenna element 12 as described above, the resin can pass through the hole 22. Therefore, the unbalance of the resin pressure is reduced on both sides of the antenna element 12. Therefore, it can be controlled to occur the deformation of the antenna element 12 in the vicinity of the end portion far from the gate 28.

It becomes a state that the antenna element 12 is embedded in the resin molded body 14 by opening the molds 30a and 30b and taking out the resin molded body integrated with the conductor pattern 10 after molding the resin as shown in FIG. 17. Thereafter, the part at the gate 28 is cut off at both sides of the resin molded body 14. Then, if the outside end of each of terminal parts 16, 18, and 20 is cut off from the frame 24 and is bent, the small antenna as shown in FIG. 14A to FIG. 14E can be obtained.

The small antenna of FIG. 14A to FIG. 14E is formed so that the thickness of the resin molded body 14 is thick on the lower part 14a of the antenna element 12 (circuit board side) and is thin on the upper part 14b thereof as well as the first embodiment. But, the thickness of the resin molded body 14 needs not differ in the lower part 14a and the upper part 14b. When the thickness of the resin molded body 14 is different on both sides of the antenna element 12 as in the sixth embodiment, it is preferable to provide the gate portion 28 to thinner side to reduce the deformation of the antenna element 12 further.

The resin molded body 14 may be projected or recessed and may be in the same plane as the side surface of the resin molded body 14 as shown in FIG. 14A to FIG. 14E.

Though the gate 28 is provided to both sides of the resin molded body 14 in the sixth embodiment, the gate 28 may be provided on one side of the resin molded body 14.

(Seventh Embodiment)

FIG. 18A to FIG. 18E are figures which show the seventh embodiment of the present invention. In FIG. 18A to FIG. 18E, the same marks are fixed to the same parts as FIG. 14A to FIG. 14E. The point where the small antenna according to the seventh embodiment is different from a small antenna of the sixth embodiment is that the projection 40 is provided on the both side ends of the part to which the hole 22 of the antenna element 12 is provided. The strength lowering of the antenna element 12 by providing the hole 22 is supplemented by the projection 40, and the deformation of the antenna element 12 near the hole 22 is decreased more.

The small antenna of FIG. 18A to FIG. 18E can be manufactured as follows. First, the conductor pattern 10 as shown in FIG. 19 is formed. In the conductor pattern 10, both side ends of the part to which the hole 22 of the antenna element 12 is provided and the frame 24 are connected by the bridge part 26 (support part). Besides, it is the same as the conductor pattern 10 of FIG. 15.

Next, the conductor pattern 10 is set in the molds 30a and 30b as shown in FIG. 20. The molds 30a and 30b in FIG. 20 are the same as the molds 30a and 30b in FIG. 16A and FIG. 16B. The method of setting the conductor pattern 10 to the molds 30a and 30b is also the same as FIG. 16A and FIG. 16B. The resin molding by injecting the resin in the state of FIG. 20. Fear that the antenna element 12 is deformed near the hole 22 when the resin molding is a little in a case of FIG. 20, since the bridge part 26 is placed between the molds 30a and 30b and pressed thereby. The small antenna as shown in FIG. 18A to FIG. 18E can be obtained by performing a similar cutting processing and bending processing to the sixth embodiment after the resin molding. The projection 40 in FIG. 18A to FIG. 18E is a part in which the bridge part 26 is cut and is left in the resin molded body 14.

The hole is provided to the antenna element in a small antenna in which a planar antenna element is embedded in the resin molded body according to the sixth embodiment and the seventh embodiment. As a result, the deformation of the antenna element can be controlled, and the small antenna with little difference in characteristic can be provided.

(Eighth Embodiment)

FIG. 21A to FIG. 21D are figures which show the eighth embodiment of the present invention. In the eighth embodiment, the same marks are fixed to the same parts as the first embodiment, and a detailed explanation will be omitted. The planar antenna element 12 is embedded in the resin molded body 14 as well as the first embodiment in the small antenna according to the eighth embodiment. The feeder terminal part 16 and the ground terminal part 18 extended from one end of the antenna element 12 are bent and are molded at the outside of the resin molded body 14 which is dielectric. The small antenna according to the eighth embodiment has the feature in the point that the narrowed portion 42 with narrow width of the conductor is provided to the bent part at the end surface of the resin molded body 14 of the feeder terminal part 16 and the ground terminal part 18.

When the feeder terminal part 16 and the ground terminal part 18 are bent in the end surface of the resin molded body 14, it is possible to bend them by the small power, when the narrowed portion 42 is provided on the base portion. In addition, the strength of the resin molded body therearound improves, too. Therefore, the crack of the resin molded body can be controlled. The configuration of the eighth embodiment is especially preferable, when the antenna element is formed by performing the copper plating to the board material of high strength which comprises the phosphorus bronze, and the iron, etc. used also for the spring material.

(Ninth Embodiment)

FIG. 22A to FIG. 22D are figures which show the ninth embodiment of the present invention. The small antenna according to the ninth embodiment also comprises a configuration in which the planar antenna element 12 is embedded in the resin molded body 14 the feeder terminal part 16 and the ground terminal part 18 are extended from the antenna element 12 as well as the first embodiment. In the ninth embodiment, the base portion side of the feeder terminal part 16 and the ground terminal part 18 are integrated. The narrowed portion 42 whose conductor width is narrow is provided on the integrated part 44, and the narrowed portion 42 is bent at the end of the resin molded body. The previous state to which each of terminal parts 16, 18, and 20 are bent is FIG. 23A and FIG. 23B.

There is a tendency that the crack is generated easily in the resin molded body 14 located between two narrowed portions 42 when two narrowed portions 42 are bent at the same time, since the narrowed portion 42 is provided in two terminal parts 16 and 18, respectively, in the case of the eighth embodiment. Since the narrowed portions 42 becomes one narrowed portion, there is no part placed between the narrowed portions 42 of the two terminals in the resin molded body 14 in the ninth embodiment. Therefore, the ninth embodiment has the advantage of generating the crack of the resin molded body 14 hardly than the case of the eighth embodiment.

(Tenth Embodiment)

FIG. 24A and FIG. 24B are figures which show the tenth embodiment of the present invention. The point where the small antenna according to the tenth embodiment is different from the small antenna according to the eighth embodiment is that the antenna elements 12 are accumulated on the surface of the resin molded body (dielectric material) 14. Even in the small antenna having such a configuration, the same effect as the small antenna of the eighth embodiment can be achieved.

According to the eighth embodiment to the tenth the embodiment, in the small antenna in which a planar antenna element is embedded in dielectric material or the small antenna accumulated on the dielectric material, the narrowed portion 42 is provided to the bent part of the terminal drawn out from the dielectric material at the end surface of the dielectric material. As a result, the power applied to dielectric material when the terminal part is bent can be reduced. In addition, the strength of dielectric material therearound can be improved. Therefore, the crack of dielectric material can be controlled. Therefore, the product yield can be improved, and the manufacturing cost can be reduced.

(Eleventh Embodiment)

FIG. 25 is a figure which shows the eleventh embodiment of the present invention. The conductor pattern 10 as shown in FIG. 25 is formed by performing the piercing processing or the etching processing of the metallic thin plate to the small antenna according to the eleventh embodiment, first, as well as the first embodiment. The conductor pattern 10 has the antenna element 12 and a frame 24 which surrounds the circumference thereof. The antenna element 12 and the frame 24 are connected by a plurality of the support parts 26 formed on the both side ends of the antenna element 12 in a suitable interval, the feeder terminal part 16 and the ground terminal part 18 formed on one end of the antenna element 12, and the fixed terminal part 20 formed on another end of the antenna element 12. The opening 50 and the positioning hole 52 formed by the piercing processing etc. are shown in FIG. 25.

In FIG. 25, it is also possible to omit the frame 24. However, it is preferable to restrict the limit of begin the expansion in the part molded by handle of the conductor pattern 10 an easy, as for there is the frame 24 extra resin as described later. The fixed terminal part 20 is provided if necessary, and can also be omitted. The ground terminal part 18 may be omitted according to the kind of the antenna element (for example, it is unnecessary when the antenna element is the meander antenna element, etc.).

Next, the conductor pattern 10 is set in the molds 30a and 30b based on the positioning pin 56 of the lower mold 30b as shown in FIG. 26 to FIG. 28. That is, the frame 24, the outside end side of the support parts 26 and the outside end sides of each terminal part 16, 18 and 20 are placed between the parting faces of the upper mold 30a and the lower mold 30b. And, the antenna element, a part of the end side of each support part 26, and a part of the end side of each terminal part 16, 18 and 20 are set to be located partly in the cavity 32 of the molds 30a and 30b. In the eleventh embodiment, the parting faces at the circumference of the cavity 32 of the molds 30a and 30b are flattened. Therefore, the space S which is led to the cavity 32 is appeared by placing the conductor pattern 10 between the molds 30a and 30b in the part (part where the frame 24, the support part 26, the terminal parts 16, 18, and 20 are not placed) which corresponds to the opening 50 of the conductor pattern 10 between in the parting faces of the molds 30a and 30b.

Under such a condition, when the resin is injected into the cavity 32, the resin is filled in the cavity 32 first. And, an extra resin flows to the space S by the pressure when the resin pressure in the cavity 32 rises to some degree. Therefore, the resin pressure in the cavity 32 can be suppressed properly. Therefore, the deformation of the antenna element 12 by enlarging the resin pressure and the residual stress of the resin molded body, too much, can be controlled.

The resin molded body integrated with the conductor pattern 10 taken out by opening the molds 30a and 30b after molding is shown in FIG. 29. The antenna element 12 is embedded in the resin molded body 14 according to FIG. 29. The part 54 (hereinafter, called as a "fin") molded in the opening 50 of the circumference of the resin molded body 14 by an extra resin of the same thickness as the conductor pattern 10 is formed. The conductor pattern 10 has the frame 24 in circumference thereof. Therefore, the fin 54 is extended only to the inner end of the frame 24 even if it is the maximum. In a word, the frame 24 restricts the limit of begin the extension of the fin 54, and has the function to prevent the resin from being leaked to outside of the molds 30a and 30b at the resin molding. The fin 54 is essentially unnecessary, but has a secondary effect which can be judged whether the molding condition is proper as a result of the fin 54.

After the resin molded body 14 is taken out from the mold, the support parts 26 and the fin 54 are cut along both sides of the resin molded body 14. In addition, the outside ends of each of terminal parts 16, 18, and 20 are cut off from the frame 24 and are bent. As a result, a small antenna as shown in FIG. 30A to FIG. 30D can be obtained. In the small antenna, the antenna element 12 is embedded in the resin molded body 14. The feeder terminal part 16 and the ground terminal part 18 are extended from one end surface of the resin molded body 14. The fixed terminal part 20 is extended from another end surface of the resin molded body 14. The lower part 14a of the resin molded body 14 is thicker than that of the upper part 14b.

(Twelfth Embodiment)

FIG. 31 is a figure which shows the twelfth embodiment of the present invention. The point where the twelfth embodiment is different from the eleventh embodiment is that the antenna element 12 and the frame 24 are connected only by the terminal parts 16, 18, and 20, and the conductor pattern 10 to which the support parts 26 is not provided is used. In the twelfth embodiment, the end of in the fixed terminal part 20 side of the antenna element 12, the feeder terminal part 16, and the ground terminal part 18 are placed between the parting faces of the upper and lower molds 30a and 30b. Thus, the space is formed in the part where the antenna element, etc. are not placed between the parting faces of the upper and lower molds 30a and 30b. As a result, when the resin is injected, the point that an extra resin flows into the space is the same as the eleventh embodiment. Therefore, the same effect as the eleventh embodiment can be achieved by the twelfth embodiment.

(Thirteenth Embodiment)

FIG. 32 is a figure which shows the thirteenth embodiment of the present invention. FIG. 32 is a state when the molding step ends. The point where the thirteenth embodiment is different from the eleventh embodiment is to use the conductor pattern 10 in which each of terminal parts 16, 18, and 20 are not connected with the frame 24. The mold 30, which forms the salient engaged with the opening 50 of the circumference of each of terminal parts 16, 18, and 20, is used for the parting face of the lower mold 30b.

In the thirteenth embodiment, the resin is prevented from flowing into the opening 50 of the circumference of each of terminal parts 16, 18, and 20 by the salient formed to the lower mold 30b. Therefore, the fin 54 is not formed to the opening 50. In addition, the resin can be prevented from adhering to the terminal parts 16, 18, and 20. Therefore, the plating processing to the terminal part performed by the post-processing and the bend processing of the terminal part, etc. become easy. Since the terminal parts 16, 18, and 20 are separated from the frame 24 beforehand, the plating processing to the entire surface the circumference surface (cutting surface) of the terminal part becomes easy, too.

(Fourteenth Embodiment)

FIG. 33A to FIG. 33C are figures which show the fourteenth embodiment of the present invention. In the fourteenth embodiment, the resin receiver 38 which is led to the cavity 32 is formed at the side of the cavity 32 of the lower mold 30b. The resin receiver 38 is led to the cavity by the narrow opening part 38a. An entrance of the opening part 38a is little deeper than the interval of the space S and becomes wider from the entrance toward the interior. And, the wide space 38b is formed to the depth part. It is preferable to provide the resin receiver 38 to the opposite side (where the resin is finally reached) to the gate 28, which is the injection entrance of the resin to the cavity 32. It is preferable that the resin receiver 38 is provided to a position different from the support part 26. In this example, the entrance of the resin receiver 38 is formed to 1 mm in width and 0.5 mm in depth. The thickness of the conductor pattern 10 is 0.127 mm. The size of the entire antenna is 2 mm in width, 15 mm in length, and 2.8 mm in thickness, or 4 mm in width, 8 mm in length, and 2.8 mm in thickness. Besides, the same marks are fixed to the same parts since it is similar to the eleventh embodiment.

An extra resin flows into the resin receiver 38 when the resin is filled in the cavity 32 by providing the resin receiver 38 as mentioned above. Therefore, the resin, which flows into the space S between the parting faces of the molds 30a and 30b, decreases. Therefore, since the fin 54, which is formed on in the opening 50 at the circumference of the resin molded body 14, can be reduced as shown in FIG. 34, the removal work of the fin is more reduced. It can be controlled that the resin pressure rapidly is raised at the resin filling final step, and the overfilling of the resin can be controlled. Therefore, the antenna element can be prevented from being deformed.

The support parts 26 and the resin receiver 38 are adjusted to different positions not to overlap the different materials in the fourteenth embodiment. Therefore, the removal work of the support parts 26 and the resin receiver 38 is easy.

If the mold which provides the resin receiver 38 as mentioned above is used and the thickness of the conductor pattern 10 is adjusted to 0.13 mm or less, when the resin with bad liquidity in which a ceramic powder is mixed, for example, is injection-molded to improve the permittivity, the generation of fin can be suppressed. The resin receiver 38 is folded later and is removed. As mentioned above, since opening part 38a of the resin receiver 38 has a taper-shape, this removal work is easy.

(Fifteenth Embodiment)

FIG. 35A to FIG. 35C are figures which show the fifteenth embodiment of the present invention. The parting face of the upper mold is flat as well as FIG. 33A to FIG. 33C, though only the lower mold 30b is shown in FIG. 35A to FIG. 35C. The point where the fifteenth embodiment is different from the fourteenth embodiment is to use the mold which forms the salient 58 engaged with the opening 50 in both vicinity of each of terminal parts 16, 18, and 20 (see FIG. 36) for the parting faces of the lower mold 30b. The thickness of salient 58 is set to the same thickness as the conductor pattern 10 or some thinner than it.

FIG. 36 shows the state that the resin molded body 14 which is molded by the above-mentioned molding and is integrated with the conductor pattern 10 is taken out from the mold. The part 38' molded by the resin receiver 38 of the resin molded body 14 is cut off later together with the support parts 26 etc. By using the lower mold 30b as mentioned above, it becomes possible to interrupt flowing the resin into the opening 50 of the circumference of each of terminal parts 16, 18, and 20 by salient 58. Therefore, a similar effect to the thirteenth embodiment is achieved. It is possible to control standing up of the resin pressure at the resin filling final step rapidly by the resin receiver 38. It is possible to mold without forming fin on each of terminal parts 16, 18, and 20 even if the accuracy of the clearance of each of terminal parts 16, 18, 20, and salient 58 somewhat becomes large. As mentioned above, it becomes easy to perform the plating processing of the terminal parts 16, 18 and 20, when the fin is not formed to the terminal parts 16, 18 and 20.

According to the eleventh embodiment to the fifteenth the embodiment, the insert molding of the antenna element is performed in the state of providing the space to which the resin can flow between in the parting faces of the mold and the resin receiver. Therefore, the resin pressure in the mold is not raised too much and the residual stress of the resin molded body becomes small, too. Therefore, the deformation of the antenna element caused by the resin pressure in the mold and the residual stress of the resin molded body can be controlled. Therefore, the small antenna with stable characteristic can be efficiently manufactured. Since the product yield improves, the manufacturing cost can be reduced.

(Sixteenth Embodiment)

The sixteenth embodiment will be explained referring to FIG. 37 to FIG. 39. The sixteenth embodiment is the embodiment which shows each of above-mentioned embodiments is selectively combined. In the sixteenth embodiment, the same marks are fixed to the same parts as the first to the fifteenth embodiments. FIG. 37 is an upper view of the small antenna according to the sixteenth embodiment of the present invention immediately after the molding, FIG. 38 is a side view of the small antenna according to the sixteenth embodiment of the present invention, and FIG. 39 is a method of taking out a small antenna of FIG. 37 from the mold. In the sixteenth embodiment, the same marks are fixed to the same parts as each above-mentioned embodiment.

The small antenna according to the sixteenth embodiment is an antenna of the surface mounting type which shows the planar antenna element 12 is embedded in the resin molded body 14.

In FIG. 37 and FIG. 38, the thickness of the lower part 14a of the resin molded body 14 of the antenna element 12 is set in the thickness necessary so that the circuit board is separated from the antenna element 12 not to generate the influence of the characteristic lowering of the antenna element 12. The thickness of the upper part 14b of the resin molded body 14 of the antenna element 12 is set to a thickness as thin as possible than the lower part 14a. The thickness of the upper part 14b is, for example, the lowest thickness necessary to protect the antenna element 12. As a result, it is possible to miniaturize the small antenna by thinning the resin molded body.

The gate portion 28 is provided to the upper part 14b of the resin molded body 14 at the resin molding in the sixteenth embodiment. The small antenna with little deformation of the antenna element and stable characteristic can be obtained by such a configuration. It is preferable that an interval d of plurality of the support part 26 which connects the antenna element 12 located in the cavity of the mold and the frame 24 to the mold by the circumference is wider at the position of the gate (position of gate part 28) and becomes narrow while being apart from the gate. As a result, the unbalance of the resin pressure which is applied upper and lower surfaces of the antenna element 12 from the filling final step to the pressure-maintaining step is relaxed. Therefore, the antenna element 12 can be prevented from being deformed by the resin pressure to the antenna element 12.

The hole 22 is provided in the vicinity of the end portion (it is a end portion on a fixed terminal 18 side in the example of shown in the figure) far from the gate portion 28 of the resin molded body 14 of the antenna element 12 in the small antenna according to the sixteenth embodiment. The hole 22 is formed at the middle of the width direction of the antenna element 12. And, the resin on both sides of the antenna element 12 is continuous (integrated) in the hole 22. The deformation in the vicinity of the end portion far from the gate portion 28 of the antenna element 12 can be controlled by such a structure. Therefore, the small antenna with little difference in characteristic can be provided.

In addition, it is valid to form fin 54 of the same thickness as the conductor pattern 10 in the opening 50 of the circumference of the resin molded body 14 and to form the resin receiver 38 which is led to the cavity 32 at the side of the cavity 32 of the lower mold 30b, to relax the resin pressure in the mold at the resin molding and to reduce the residual stress of the resin molded body, as means to prevent the antenna element 12 from being deformed. As a result, the resin pressure in the mold is not raised too much and the residual stress of the resin molded body becomes small, too. Therefore, the deformation of the antenna element caused by the resin pressure in the mold and the residual stress of the resin molded body can be controlled. Therefore, the small antenna whose characteristic is even can be efficiently manufactured. Since the product yield improves, the manufacturing cost can be reduced.

When the mold is opened and the small antenna molded as described above is taken out, the ejector pin is struck and ejected at the position where the upper middle part of the resin molded body is avoided as shown in FIG. 39. Therefore, the position sucked by the mounter becomes a flat surface without the incrustation of the ejector pin in the small antenna manufactured in the manufacturing method according to the sixteenth embodiment. As a result, there is no fear of the air leakage at picking-up, and the pickup mistake can be reduced.

After the resin molded body is taken out from the mold 30, the feeder terminal part 16 extended from another end of the planar antenna element 12 embedded in the resin molded body 14 and the ground terminal part 18 bend at outside of the resin molded body 14 which is dielectric is molded. The resin molded body might be cracked in this case. To avoid this, it is preferable to provide the narrowed portion 42 with narrow width of the conductor to the bent part at the end of the resin molded body 14 of the feeder terminal part 16 and the ground terminal part 18. As a result, the power applied to dielectric material when the terminal part is bent can be reduced. In addition, the strength of the dielectric material in the vicinity thereof can be improved. Therefore, the crack of dielectric material can be controlled. Therefore, the product yield can be improved, and the manufacturing cost can be reduced.

Other shapes which are meander and the helical, etc. are acceptable for the antenna element, though the planar antenna element is shown as the antenna element 12 in each above-mentioned embodiment.

It is preferable to use the compound material which enables the injection molding by mixing the resin and ceramics, though the dielectric material is not especially limited.

The undermentioned invention and other inventions can be understood from the above-mentioned embodiment.

The small antenna according to the first aspect is characterized by comprising: a planar antenna element; and a resin molded body integrally molded with the antenna element, in which the resin molded body has a thin part and a thick part on both sides of the antenna element, and a gate portion at a resin molding is provided to the thin part. In the first aspect, the necessary thickness of the resin molded body is secured at one surface side of the antenna element and the thickness of another side of the antenna element of the resin molded body is thinner than that of one surface side. As a result, the thickness of the resin molded body can be thinned as a whole. The deformation of the antenna element can be controlled by providing the gate portion of the resin molding to the thinner side of the resin molded body. It is thought that the resin comes to be supplied enough to thinner side when the resin molded body is molded, and the resin pressure on both sides of the antenna element is more balanced, though this reason is not clear.

It is preferable that the thin part is provided on a part of the thick part of the antenna element in the first aspect. The resin flowing to one surface side can be limited further by partially providing the thin part to one surface side of the antenna element, that is, the side where the thick resin molded body is formed. Therefore, the deformation of the antenna element can be more reduced.

The small antenna according to the second aspect is characterized by comprising: a planar antenna element; a resin molded body integrally molded with the antenna element; and a hole formed to the antenna element. The balance of the resin pressure is not kept off greatly on both sides of the antenna element 12 by providing the hole. Therefore, the small antenna with little deformation of the antenna element can be obtained.

A lot of deformations of the antenna element are occurred in the vicinity of the end portion far from the gate portion of the resin molded body. Therefore, it is preferable that a projection formed on both side ends of a part where the hole of the antenna element is provided is further comprised. It is preferable to provide the "hole" in the vicinity of both ends, when the gate portion is in the vicinity of a middle part of the antenna element. However, even if the "hole" is provided in the vicinity of either end portion a good result is obtained than the case that the "hole" is not provided.

It is preferable that the hole of the antenna element is provided to an end portion side far from the gate portion of the resin molded body. When the hole is formed to the antenna element, the strength in the corresponding part lowers and the deformation might be occurred. Therefore, the projection as mentioned above is formed, and the projection is placed between the molds. As a result, the antenna element can be prevented from being deformed by forming the hole.

The small antenna according to the third aspect is characterized by comprising: an antenna element; and a resin molded body in which the antenna element is embedded or which is accumulated, the antenna element having a terminal extended to an outside of the resin molded body, in which the terminal comprises a narrowed portion with narrow width of a conductor at a base thereof, and the narrowed portion is bent at an outside of the resin molded body. When the part drawn out from the dielectric material is bent in the end surface of dielectric material, it is possible to bend by the smaller power by providing the narrowed portion. In addition, the strength in the vicinity of the dielectric material can be improved. Therefore, the crack of the dielectric material is not generated easily.

There is a tendency that the crack is generated easily in the part of the dielectric material located between the feeder terminal and the ground terminal especially, in the antenna having the configuration in which the feeder terminal and the ground terminal are extended from the side of the antenna element. It is preferable that a base side of a feeder terminal and a ground terminal extended from the antenna element are integrated, and the narrowed portion with the narrow width of the conductor is provided to the integration part for the above-mentioned antenna. With this configuration, it becomes the same state as performing the bend processing of one terminal, since there is no the part of the dielectric material placed between two terminals. Therefore, the crack of the dielectric material is generated more hardly.

The manufacturing method of the small antenna according to the fourth aspect is characterized by comprising: setting an antenna element to place the antenna element between a first mold and a second mold of the mold; and integrally molding a resin molded body to embed the antenna element by injecting the resin to the mold, in which a depth of a cavity of the first mold is shallower than a depth of a cavity of the second the mold, and a gate portion is provided to the first mold. In this configuration, it is preferable to widen the interval of the support part which connects the antenna element located in the cavity and the frame placed between the molds at the circumference thereof at the position of the gate, and becomes narrow apart from the gate. Thus, the deformation by the resin pressure of the antenna element can be prevented by relaxing the unbalance of the resin pressure applied to the upper and lower sides of the antenna element.

It is preferable that an interval of support parts which connects the antenna element set in the cavity of the mold and a frame placed between the mold at a circumference thereof is wide at a position of the gate portion and becomes narrow apart from the gate portion in the fourth aspect. With this configuration, the deformation by the resin pressure of the antenna element can be prevented by relaxing the unbalance of the resin pressure applied to the upper and lower sides of the antenna element.

The manufacturing method of the small antenna according to the fifth aspect is characterized by comprising: setting an antenna element in a mold; performing injection molding by injecting a resin which is a dielectric material in the mold; and ejecting a resin molded body by striking an ejector pin to the resin molded body, when the mold is opened and the resin molded body after the injection molding is taken out, in which the resin molded body has the surfaces whose thickness are different at both sides of the antenna element, and ejecting including striking the ejector pin to a thicker surface of the resin molded body and ejecting the resin molded body. With this configuration, since the strength of the resin molded body on the side where the ejector pin ejects improves, it becomes possible to endure more high-speed ejection operation.

The manufacturing method of the small antenna according to the sixth aspect is characterized by comprising: setting an antenna element in a mold; performing injection molding by injecting a resin which is dielectric material in the mold; and ejecting a resin molded body by striking an ejector pin to the resin molded body, when the mold is opened and the resin molded body after the injection molding is taken out, in which ejecting includes striking the ejector pin to a position where a part to which the resin molded body is picked up is avoided and ejecting the resin molded body. Since the position sucked by the mounter becomes a flat surface without the incrustation of the ejector pin in the small antenna manufactured as mentioned above, there is no fear of the air leakage at picking-up, and the pickup mistake can be reduced.

It is preferable that a compound material of a resin and a ceramics is used as the dielectric material in the fifth aspect and the sixth aspects. A practicable small antenna can be efficiently manufactured by the injection molding method, since such a compound material has the high permittivity in addition, excellent stability in the temperature and the humidity, and the injection molding is possible.

The manufacturing method of the small antenna according to the seventh aspect is characterized by comprising: setting an antenna element by placing at least a part between parting faces of a mold; and injecting a resin in the mold, in which setting includes setting the antenna element to form a space in a part where the antenna element is not placed in the parting faces.

The manufacturing method of the small antenna according to the eighth aspect is characterized by comprising: setting an antenna element by placing at least a part between parting faces of the mold; and injecting a resin in the mold and performing a molding, in which a plurality of support parts extended to an outside to at least two opposite sides in the antenna element are integrally formed, and setting includes setting the antenna element to place the support parts between the parting faces of the mold in the parting faces, and form a space in a part where the support parts between the parting faces of the mold is not placed.

As mentioned above, it becomes possible to control the residual stress in the resin molded body to low, and control the deformation of the antenna element, since the extra resin can be flowed out to the space.

It is preferable that the support parts are formed to connect between the antenna element and a frame which surrounds a circumference thereof, and the resin molding is performed in a state that the support parts and the frame placed between the parting faces of the mold in the seventh aspect and the eighth aspect. With this configuration, the limit of the extension of the extra resin can be restricted by the frame, and the work at manufacturing improves.

It is preferable that the mold has a flat parting faces to decrease the mold cost as the mold in each above-mentioned aspect.

The part molded by the extra resin is generated to the space at the resin molding in each above-mentioned aspect. It is preferable to take out the resin molded body from the mold after molding; and cut off and remove a part which is molded by the space with the support part and is projected to an outside of the resin molded body. This part can be easily removed by cutting it at the same time when the support parts projected to the outside of the resin molded body is cut, after the resin molded body is taken out from the mold.

It is preferable that the mold has a resin receiver which is led to the cavity at a side of the cavity of the mold in each above-mentioned aspect. The same effect as the fin can be achieved by providing such a resin receiver and flowing the extra resin thereto.

It is preferable to set at least a part of the antenna element by placing it between the parting faces of the mold; and to perform a molding by injecting the resin in the mold, in which the support parts extended to an outside of the antenna element is formed, integrally, the support parts are placed between the parting faces of the mold, and a resin receiver is provided in a part where the support parts between the parting faces of the mold is not placed in the eighth aspect. In this case, the effect same as the fin can be achieved. It is preferable to take out the resin molded body from the mold after molding; and cut off and removing a part which is molded by the space with the support part and is projected to an outside of the resin molded body. When the resin receiver is provided at the different position from the support parts, the work to cut off them from the resin molded body is easy.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A small antenna comprising:
   a planar antenna element; and
   a resin molded body integrally molded with said antenna element, wherein
   said resin molded body has a thin part and a thick part on both sides of said antenna element, and a gate portion at a resin molding is provided to the thin part.

2. The small antenna according to claim 1, wherein the thick part of said resin molded body has a thin part on a part thereof.

3. A small antenna comprising:
a planar antenna element;
a resin molded body integrally molded with said antenna element; and
a hole formed to said antenna element.

4. The small antenna according to claim 3, further comprising a projection formed on both side ends of a part where said hole of the antenna element is provided.

5. The small antenna according to claim 3, wherein said resin molded body has a gate portion, and said hole of said antenna element is provided to an end portion side far from the gate portion of said resin molded body.

6. A small antenna comprising:
an antenna element; and
a resin molded body in which said antenna element is embedded or which is accumulated, said antenna element having a terminal extended to an outside of said resin molded body, wherein
said terminal comprises a narrowed portion with narrow width of a conductor at a base thereof, and
said narrowed portion is bent at an outside of said resin molded body.

7. The small antenna according to claim 6, wherein a base side of a feeder terminal and a ground terminal extended from said antenna element are integrated, and the narrowed portion with the narrow width of the conductor is provided to the integration part.

8. A manufacturing method of a small antenna comprising:
setting an antenna element to place the antenna element between a first mold and a second mold of the mold; and
integrally molding a resin molded body to embed the antenna element by injecting the resin to the mold, wherein
a depth of a cavity of the first mold is shallower than a depth of a cavity of the second mold, and
a gate portion is provided to the first mold.

9. The manufacturing method of the small antenna according to claim 8, wherein an interval of support parts which connects the antenna element set in the cavity of the mold and a frame placed between the mold at a circumference thereof is wide at a position of the gate portion and becomes narrow apart from the gate portion.

10. A manufacturing method of a small antenna comprising:
setting an antenna element in a mold;
performing injection molding by injecting a resin which is a dielectric material in said mold; and
ejecting a resin molded body by striking an ejector pin to the resin molded body, when the mold is opened and the resin molded body after the injection molding is taken out, wherein
said resin molded body has the surfaces whose thickness are different at both sides of the antenna element, and
ejecting including striking the ejector pin to a thicker surface of said resin molded body and ejecting said resin molded body.

11. A manufacturing method of a small antenna comprising:
setting an antenna element in a mold;
performing injection molding by injecting a resin which is dielectric material in said mold; and
ejecting a resin molded body by striking an ejector pin to the resin molded body, when the mold is opened and the resin molded body after the injection molding is taken out, wherein
ejecting includes striking the ejector pin to a position where a part to which said resin molded body is picked up is avoided and ejecting the resin molded body.

12. The method of manufacturing the small antenna according to claim 10, wherein a compound material of a resin and a ceramics is used as the dielectric material.

13. The method of manufacturing the small antenna according to claim 11, wherein a compound material of a resin and a ceramics is used as the dielectric material.

14. A manufacturing method of a small antenna comprising:
setting a part of an antenna element to be sandwiched and contacted with parting faces of a mold; and
injecting a resin in the mold, wherein
setting includes setting the antenna element to form a space in a part where the antenna element is not placed and faced in the parting faces.

15. A manufacturing method of a small antenna comprising:
setting an antenna element by placing at least a part between parting faces of the mold; and
injecting a resin in the mold and performing a molding, wherein
a plurality of support parts extended to an outside to at least two opposite sides in the antenna element are integrally formed, and
setting includes setting the antenna element to place the plurality of support parts between the parting faces of the mold in the parting faces, and form a space in a part where the plurality of support parts between the parting faces of the mold is not placed.

16. The method of manufacturing in the small antenna according to claim 15, wherein
the plurality of support parts are formed to connect between the antenna element and a frame which surrounds a circumference thereof, and
the resin molding is performed in a state that the plurality of support parts and the frame placed between the parting faces of the mold.

17. The method of manufacturing in the small antenna according to claim 14, wherein the mold has a flat parting faces.

18. The method of manufacturing in the small antenna according to claim 15, wherein the mold has a flat parting faces.

19. The method of manufacturing in the small antenna according to claim 15, further comprising:
taking out the resin molded body from the mold after molding; and
cutting off and removing a part which is molded by said space with said plurality of support parts and is projected to an outside of the resin molded body.

20. The method of manufacturing the small antenna according to claim 14, wherein the mold has a resin receiver which is led to the cavity at a side of the cavity of said mold.

21. The method of manufacturing the small antenna according to claim 20, further comprising:
setting at least a part of the antenna element by placing it between the parting faces of the mold; and
performing a molding by injecting the resin in the mold, wherein
a plurality of support parts extended to an outside of the antenna element is formed, integrally, the plurality of support parts are placed between the parting faces of the mold, and the resin receiver is provided in a part where the plurality of support parts between the parting faces of the mold is not placed.

22. The method of manufacturing the small antenna according to claim 21, further comprising:

taking out the resin molded body from the mold after molding; and cutting off and removing a part which is molded by said space with said plurality of support parts and is projected to an outside of the resin molded body.

23. The method of manufacturing the small antenna according to claim 15, wherein the mold has a resin receiver which is led to the cavity at a side of the cavity of said mold.

24. The method of manufacturing the small antenna according to claim 23, further comprising:

setting at least a part of the antenna element by placing it between the parting faces of the mold; and performing a molding by injecting the resin in the mold, wherein the plurality of support parts extended to an outside of the antenna element is formed, integrally, the plurality of support parts are placed between the parting faces of the mold, and the resin receiver is provided in a part where the plurality of support parts between the parting faces of the mold is not placed.

25. The method of manufacturing the small antenna according to claim 24, further comprising:

taking out the resin molded body from the mold after molding; and cutting off and removing a part which is molded by said space with said plurality of support parts and is projected to an outside of the resin molded body.

* * * * *